US007770124B2

(12) United States Patent
Argo et al.

(10) Patent No.: US 7,770,124 B2
(45) Date of Patent: Aug. 3, 2010

(54) USING A DESCRIPTION LANGUAGE TO BUILD A MANAGEMENT SYSTEM

(75) Inventors: Kenneth A. Argo, Redmond, WA (US); Jeffry B. Phillips, Seattle, WA (US); Jie Liu, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 11/056,051

(22) Filed: Feb. 11, 2005

(65) Prior Publication Data

US 2006/0184826 A1 Aug. 17, 2006

(51) Int. Cl.
G06F 3/00 (2006.01)
G06F 11/00 (2006.01)
G06F 7/00 (2006.01)
G06F 17/30 (2006.01)
G06F 9/44 (2006.01)
G06F 9/46 (2006.01)
G06F 13/00 (2006.01)

(52) U.S. Cl. .................. 715/762; 715/760; 714/27; 719/310; 707/4

(58) Field of Classification Search .............. 715/712, 715/708, 705, 809, 760, 762; 714/27
See application file for complete search history.

(56) References Cited

U.S. PATENT DOCUMENTS

| | | | | |
|---|---|---|---|---|
| 5,930,503 | A * | 7/1999 | Drees | 713/1 |
| 5,999,948 | A | 12/1999 | Nelson et al. | |
| 6,061,695 | A | 5/2000 | Slivka et al. | |
| 6,182,134 | B1 | 1/2001 | Collins et al. | |
| 6,212,581 | B1 * | 4/2001 | Graf | 710/18 |
| 6,298,349 | B1 | 10/2001 | Toyoshima et al. | |
| 6,337,696 | B1 | 1/2002 | Lindhorst et al. | |
| 6,342,907 | B1 | 1/2002 | Petty et al. | |
| 6,353,446 | B1 | 3/2002 | Vaughn et al. | |
| 6,356,920 | B1 | 3/2002 | Vandersluis | |

(Continued)

OTHER PUBLICATIONS

"Microsoft Management Console: Overview," Oct. 7, 1999, available at <<http://www.microsoft.com/windows2000/techinfo/howitworks/management/mmcover.asp>>, accessed on Nov. 8, 2005, 2 pages.

(Continued)

Primary Examiner—Joshua D Campbell
Assistant Examiner—Stephen Alvesteffer
(74) Attorney, Agent, or Firm—Lee & Hayes, PLLC

(57) ABSTRACT

Functionality and corresponding procedures are described for building a management system. The management system provides description language content (such as markup language content) which describes different aspects of the management system in a declarative manner. The management system also includes generic resource content for performing various general purpose tasks that can be applied to different applications of the management system. The management system provides a specific management-related service by combining the description language content with the generic resource content. In other words, the description language content effectively tailors the generic code content to provide the management-related service. One aspect of the description language content governs a manner of populating management information to be presented by the management system. Another aspect of the description language content governs a manner of displaying the retrieved management information to a user. Another aspect of the description language content governs a manner whereby the user can interact with displayed management information.

16 Claims, 23 Drawing Sheets

U.S. PATENT DOCUMENTS

| | | | |
|---|---|---|---|
| 6,363,421 B2 * | 3/2002 | Barker et al. | 709/223 |
| 6,727,918 B1 | 4/2004 | Nason | |
| 6,779,155 B1 | 8/2004 | Bahrs et al. | |
| 6,782,420 B1 * | 8/2004 | Barrett et al. | 709/223 |
| 6,964,051 B1 | 11/2005 | Palaniappan | |
| 6,990,654 B2 | 1/2006 | Carroll, Jr. | |
| 7,133,906 B2 | 11/2006 | Price et al. | |
| 7,176,949 B1 * | 2/2007 | Moser | 715/705 |
| 7,606,767 B1 | 10/2009 | Couper et al. | |
| 2002/0120685 A1 | 8/2002 | Srivastava et al. | |
| 2002/0133516 A1 | 9/2002 | Davis et al. | |
| 2002/0156814 A1 | 10/2002 | Ho | |
| 2002/0194171 A1 * | 12/2002 | Judd et al. | 707/4 |
| 2003/0088410 A1 | 5/2003 | Geidl et al. | |
| 2003/0110447 A1 | 6/2003 | Froyd et al. | |
| 2003/0172344 A1 | 9/2003 | Dencker et al. | |
| 2004/0109017 A1 | 6/2004 | Rothman et al. | |
| 2005/0278723 A1 * | 12/2005 | Feinleib et al. | 719/310 |
| 2005/0283733 A1 | 12/2005 | Ellinger et al. | |
| 2006/0020657 A1 | 1/2006 | Liu et al. | |

OTHER PUBLICATIONS

"SMS 2003 Product Information: Overview," available at <<http://www.microsoft.com/smserver/evaluation/default.mspx>>, accessed on Nov. 8, 2005.

* cited by examiner

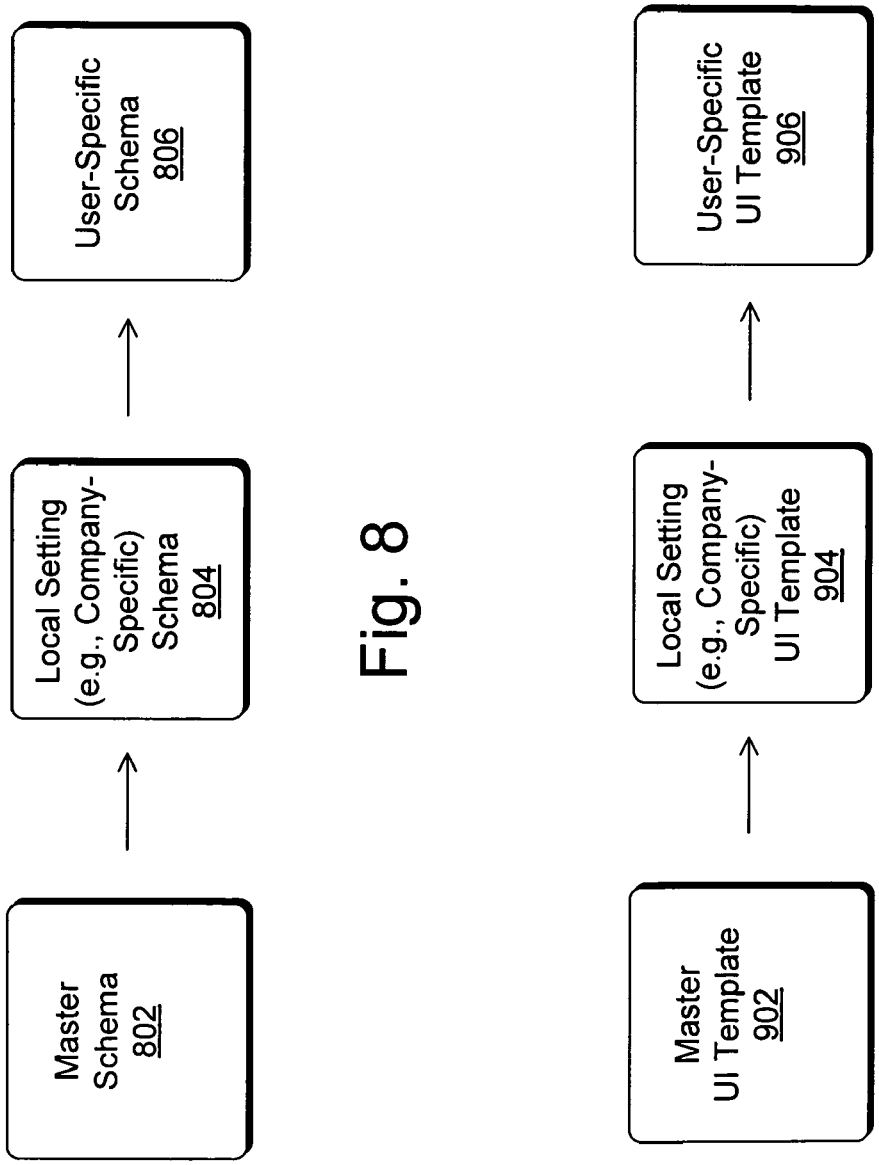

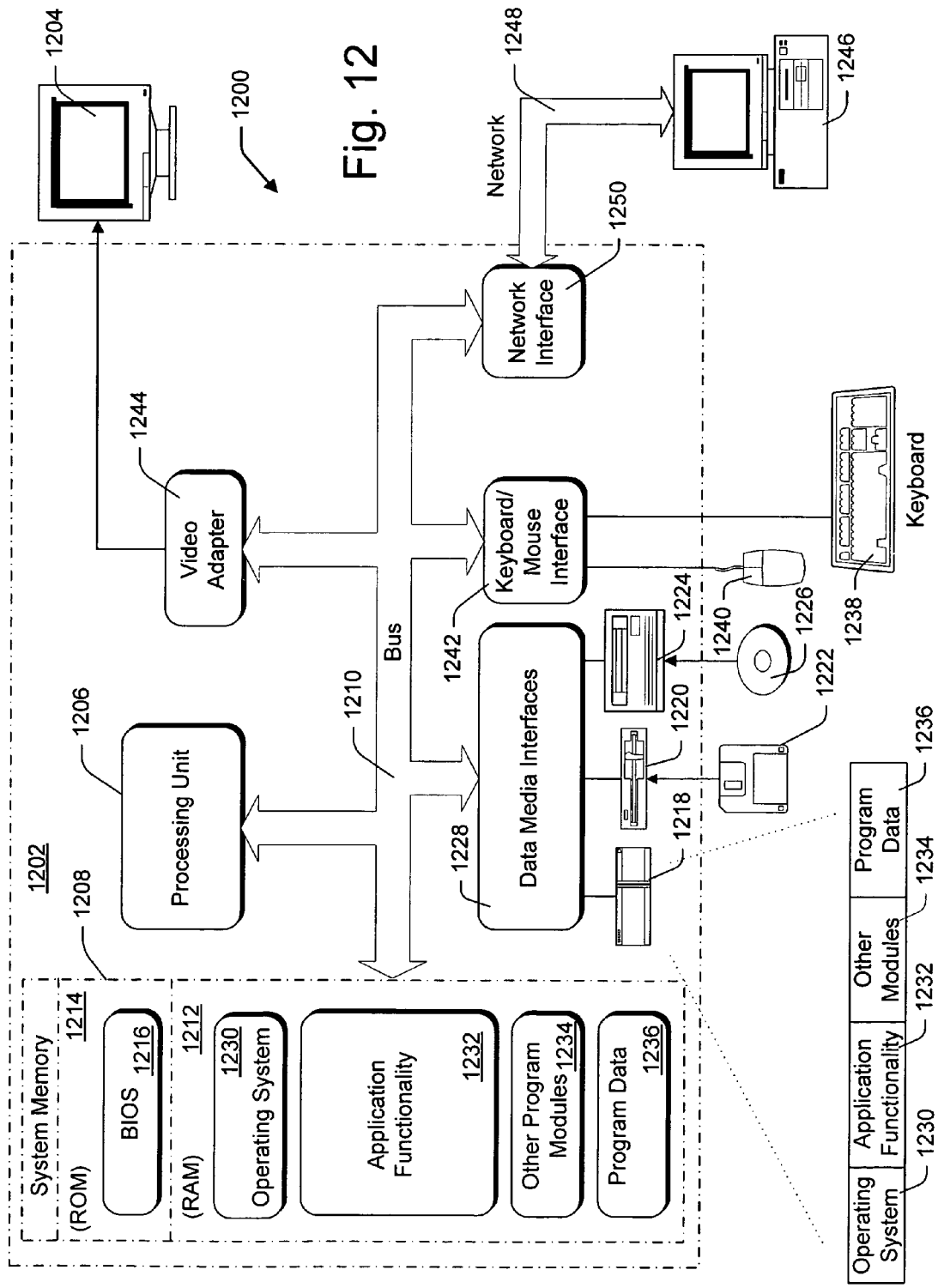

```xml
<?xml version="1.0" encoding="utf-8"?>
<RootNodeDescription xmlns:xsi="http://www.w3.org/2001/XMLSchema-instance" xmlns:xsd="http://www.w3.org/2001/XMLSchema" Id="98adbc83-ecbc-43f7-a3c3-cdadaf19c16b">
  <Name>Collections</Name>
  <Description>Collections</Description>
  <ImagesDetail>
    <UnselectedImage IsNumeric="true" Id="0" />
    <SelectedImage IsNumeric="true" Id="0" />
  </ImagesDetail>
  <Guid>00000000-0000-0000-0000-000000000000</Guid>
  <ViewAssemblyDetails>
    <AssemblyDetail Assembly="Microsoft.SystemsManagementServer.ConsoleFramework.Views.DebugView.DebugViewDescription">
      <Path>DebugView.dll</Path>
      <Method>ShowDebugView</Method>
    </AssemblyDetail>
  </ViewAssemblyDetails>
  <ClipboardFormats />
  <Actions />
  <ChildNodes />
  <RelativeNodes />
  <RootNodes>
    <NodeDescription>
    <GlobalScopeActions />
    <GlobalResultActions />
```

```
<ScopeActions>
<ScopePaneItemDescription>
  <Queries>
    <QueryDetail Type="WQL" Priority="0" Id="6433e8c6-3a6a-43ab-bb37-fa8da4544553">
      <Name>[Name]</Name>
      <Query>select coll.* from SMS_Collection as coll join SMS_CollectToSubCollect
as assoc on coll.CollectionID=assoc.subCollectionID where assoc.parentCollectionID="COLLROOT"</Query>
      <ImagesDetail ImageFilePath="">
        <UnselectedImage IsNumeric="true" Id="0" />
        <SelectedImage IsNumeric="true" Id="0" />
      </ImagesDetail>
      <ClipboardFormats />
      <ViewAssemblyDetails>
        <AssemblyDetail Assembly="Microsoft.SystemsManagementServer.ConsoleFramework.
Views.DebugView.DebugViewDescription">
          <Path>DebugView.dll</Path>
          <Method>ShowDebugView</Method>
        </AssemblyDetail>
      </ViewAssemblyDetails>
      <SupportedTypes />
    </QueryDetail>
  </Queries>
  <Actions />
  <Relatives />
  <Children />
</ScopePaneItemDescription>
</ScopeActions>
```

```xml
<ResultActions>
<ResultPanelItemDescription>
<Queries>
<QueryDetail Type="WQL" Priority="0" Id="7e30511f-efec-4d2e-846a-2b2a7ea99108">
<Name />
<Query>select coll.* from SMS_Collection as coll join SMS_CollectToSubCollect as assoc on coll.CollectionID=assoc.subCollectionID where assoc.parentCollectionID="COLLROOT"</Query>
<ImagesDetail>
<UnselectedImage IsNumeric="true" Id="0" />
<SelectedImage IsNumeric="true" Id="0" />
</ImagesDetail>
<ClipboardFormats />
<ViewAssemblyDetails />
<SupportedTypes />
</QueryDetail>
</Queries>
<Actions />
</ResultPanelItemDescription>
</ResultActions>
<Children />
<NodeDescriptions>
<GlobalScopeActions />
<GlobalResultActions />
```

1702 points to the `<Query>` line.

```xml
<ScopeActions>
  <ScopePanelItemDescription>
    <Queries>
      <QueryDetail Type="WQL" Priority="0" Id="b28251ae-e04f-466c-889c-008938c5610e">
        <Name>[Name]</Name>
        <Query>select coll.* from SMS_Collection as coll join SMS_CollectToSubCollect as assoc on coll.CollectionID=assoc.subCollectionID where assoc.parentCollectionID='[CollectionID]'</Query>
        <ImagesDetail>
          <UnselectedImage IsNumeric="true" Id="0" />
          <SelectedImage IsNumeric="true" Id="0" />
        </ImagesDetail>
        <ClipboardFormats />
        <ViewAssemblyDetails>
          <AssemblyDetail Assembly="Microsoft.SystemsManagementServer.ConsoleFramework.Views.DebugView.DebugViewDescription">
            <Path>DebugView.dll</Path>
            <Method>ShowDebugView</Method>
          </AssemblyDetail>
        </ViewAssemblyDetails>
        <SupportedTypes />
      </QueryDetail>
    </Queries>
    <Actions />
    <Relatives />
    <Children />
  </ScopePanelItemDescription>
</ScopeActions>
```

(label 1802 points to the `<Query>` line)

```
<ResultActions>
<ResultPanelItemDescription>
<Queries>
<QueryDetail Type="WQL" Priority="0" Id="ae0d79d5-6786-499b-86d5-4eebed58f7a4">
  <Name />
1902 ——  <Query>select * from [MemberClassName]</Query>
  <ImagesDetail>
    <UnselectedImage IsNumeric="true" Id="0" />
    <SelectedImage IsNumeric="true" Id="0" />
  </ImagesDetail>
  <ClipboardFormats />
  <ViewAssemblyDetails />
  <SupportedTypes />
</QueryDetail>
</Queries>
<Actions />
</ResultPanelItemDescription>
</ResultActions>
<Children />
</NodeDescriptions>
</NodeDescription>
</RootNodes>
</RootNodeDescription>
```

(End XML)

Fig. 19

```xml
<?xml version="1.0" encoding="utf-8" ?>
<SmsPropertySheet FormatVersion="1.0">
    <PropertySheet Guid="{066e1c64-4686-45c9-bdb4-8d3dfb219826}" IsWizard="True">
        <Assembly Name="SmsPackage" Namespace="Microsoft.SystemsManagementServer.ConsoleFramework.DialogFramework.Package" WizardFormType="PackageWizardForm"/>
        <PropertyPages>
            <PropertyPage Guid="{8F40A80D-5FAF-4272-A39D-0377C471A0ED}"
             Type="GeneralWizardPage" Skippable="False" HelpTopic="/Distrbsw/dpkgprp1.htm"/>
            <Properties>
                <Property Name="Name" DefaultValue="Pkg">
                    <TextValidation MinLength ="1" MaxLength="35">
                        <MustMatchPatterns>
                            <MustMatch RegEx=""/>
                            <MustMatch RegEx=""/>
                        </MustMatchPatterns>
                        <MustNotMatchPatterns>
                            <MustNotMatch RegEx=""/>
                            <MustNotMatch RegEx=""/>
                        </MustNotMatchPatterns>
                    </TextValidation>
                </Property>
```

```
<Property Name="Version" DefaultValue="">
  <TextValidation MinLength ="1" MaxLength="35">
    <MustMatchPatterns>
      <MustMatch RegEx=""/>
      <MustMatch RegEx=""/>
    </MustMatchPatterns>
    <MustNotMatchPatterns>
      <MustNotMatch RegEx=""/>
      <MustNotMatch RegEx=""/>
    </MustNotMatchPatterns>
  </TextValidation>
</Property>
<Property Name="Manufacturer" DefaultValue="MS">
  <TextValidation MinLength ="0" MaxLength="35">
    <MustMatchPatterns>
      <MustMatch RegEx=""/>
      <MustMatch RegEx=""/>
    </MustMatchPatterns>
    <MustNotMatchPatterns>
      <MustNotMatch RegEx=""/>
      <MustNotMatch RegEx=""/>
    </MustNotMatchPatterns>
  </TextValidation>
</Property>
<Property Name="Language" DefaultValue="ENU">
  <TextValidation MinLength ="0" MaxLength="35"></TextValidation>
</Property>
```

```xml
<Property Name="Description" DefaultValue="">
    <TextValidation MinLength ="0" MaxLength="35"></TextValidation>
    </Property>
    <Property Name="IconSize" DefaultValue="0"></Property>
  </Properties>
</PropertyPage>
<PropertyPage Guid="{EB771311-FA48-4e8e-91E8-4403BEB3CBB7}"
Type="DataSourceWizardPage" Skippable="False" HelpTopic="/Distrbsw/dpkgprp2.htm">
  <Properties>
    <Property Name="PkgSourceFlag" DefaultValue="1"></Property>
  </Properties>
</PropertyPage>
<PropertyPage Guid="{7BC79A84-EA6D-4a5e-B2C7-01E2338A2FF3}"
Type="DataAccessWizardPage" Skippable="False" HelpTopic="/distrbsw/dpkgprp3.htm">
  <Properties>
    <Property Name="ShareType" DefaultValue="1"></Property>
    <Property Name="ForcedDisconnectEnabled" DefaultValue="false"></Property>
    <Property Name="ForcedDisconnectNumRetries" DefaultValue="2"></Property>
    <Property Name="ForcedDisconnectDelay" DefaultValue="5"></Property>
  </Properties>
```

```
</PropertyPage>
<PropertyPage Guid="{676504CF-4E1E-4a86-9D44-0D9700287149}"
 Type="DistributionSettingsWizardPage" Skippable="False" HelpTopic="/Distrbsw/dpkgprp4.htm"></PropertyPage>
<PropertyPage Guid="{781045C2-3D45-4fdc-AD4C-5871B69AF364}"
 Type="ReportingWizardPage" Skippable="False" HelpTopic="/Distrbsw/dpkgprp5.htm"></PropertyPage>
<PropertyPage Guid="{20DC9FA7-95BF-44ef-9C7E-A95E3C1844FF}"
 IsCustomPage="True" Type="SecurityWizardPage" Skippable="False" HelpTopic="/Config/Security/dSecTab.htm">
    <CustomAssembly Name="Microsoft.SystemsManagementServer.CommonDialogs"
     Namespace="Microsoft.SystemsManagementServer.Common.Dialogs"/>
</PropertyPage>
</PropertyPages>
</SmsPropertySheet>

(End XML)
```

Fig. 25

USING A DESCRIPTION LANGUAGE TO BUILD A MANAGEMENT SYSTEM

CROSS REFERENCE TO RELATED APPLICATIONS

This application is related to commonly assigned U.S. Ser. No. 11/056,417 filed on the same date as the present application, entitled "USING A DESCRIPTION LANGUAGE TO PROVIDE A USER INTERFACE PRESENTATION," naming Kenneth A. Argo, Jie Liu, and Jeffrey B. Phillips as inventors. This related application is incorporated herein by reference in its entirely.

TECHNICAL FIELD

This subject matter relates to strategies for building a management system.

BACKGROUND

Management systems allow users to manage target functionality. "Target functionality" can comprise an application or applications, e.g., as implemented by one or more computer systems, which are the "target" of the management system's management operations. One well known management system uses the Microsoft Management Console (MMC), provided by Microsoft Corporation of Redmond, Wash. Detailed information regarding the MMC management system is provided by a number of sources, such as Microsoft Corporation's MSDN online library site.

Broadly stated, a typical management system provides a container (a management console) which binds together a collection of tools for managing different aspects of target functionality. Accordingly, the characteristics of a management system may differ depending on the types of tools that the management system incorporates. In a typical role, the management system allows a user to query the target functionality to extract management information from the target functionality. The management system then presents the retrieved management information to the user and allows the user to interact with the management information. For instance, the user can use the management system to manage the configuration of some aspect of the target functionality. In this role, the management system queries the target functionality to extract configuration information from one or more configuration databases maintained by the target functionality. The management system then allows the user to perform various actions that affect the configuration information, which thereby affects the configuration of the target functionality.

FIG. 1 shows salient features of a known system 100 that uses a management system 102 to govern the operation of target functionality 104. As described above, the management system 102 provides a shell or container which aggregates different tools. Code resources 106 provide the functionality which implements the management system 102.

The management system 102 provides an integrated user interface presentation that allows a user 108 to conveniently interact with the management system 102's tools. Namely, the user 108 can interact with the management system 102 via a series of user interface presentations 110 provided on a display device 112 (such as a CRT device, an LCD device, etc.), in conjunction with an input mechanism 114 (such as a keyboard, a touch screen, a mouse-type pointing device, a joystick, and so forth).

The target functionality 104 with which the management system 102 interacts can be implemented using a standalone computer unit (e.g., a personal computer workstation), a system that comprises plural computer units and associated databases (such as a server system and associated databases), or some other functionality. In any event, the target functionality 104 can comprise one or more management stores 116. The management stores 116 store management information which governs the operation of one or more applications 118 implemented by the target functionality 104. For example, the management information can correspond to configuration information that pertains to various settings, security-related information, etc. that govern the operation of one or more applications 118.

In operation, the management system 102 functions by: (1) querying the management stores 116 to determine the management information (e.g., configuration information) stored therein; (2) retrieving the management information and presenting it to the user 108 via the one or more user interface presentations 110; and (3) allowing the user 108 to interact with the management information (which enables the user 108 to modify the management information stored in the management stores 116). As to the first of these enumerated tasks, the system 100 provides retrieval functionality 120 which allows the user 108 to query the management stores 116 and extract information from these stores 116. In an exemplary environment that uses a Windows™ operating system, the retrieval functionality 120 can rely on Windows™ Management Instrumentation (WMI) technology. Alternatively, or in addition, the retrieval functionality 120 can rely on, in whole or in part, SQL-related technology, Active Directory technology, and so forth.

The user interface presentations 110 provided by the management system 102 can use different strategies for presenting management information to the user 108 and for allowing the user 108 to interact with that information. FIGS. 2-4 provide representative examples of user interface presentations 110 based on the UI paradigm employed by Microsoft Corporation's MMC management console. Referring first to FIG. 2, a main user interface presentation 200 includes two panes. A so-called scope pane 202 establishes the "scope of management" of the management system. Namely, the scope specifies the boundaries that define where the configuration information originates and the aspects of the system that are managed by changes in the configuration information. For example, a management system directed to the configuration of an operating system might specify a root of "System," and, the System scope can allow a user to configure a disk (defining another scope in its own right), and so forth. FIG. 2 shows that the scope pane 202 includes a plurality of nodes arranged in a tree-like hierarchical relationship. The topmost node in the tree defines a root node. Nodes that depend on the root node define child nodes. Based on this paradigm, the user 108 can organize tools into categories based on the commonality of different groups of tools, and so forth. The management system 102 can represent each node in the scope pane 202 using textual information and/or an image icon.

The user 108 can expand any parent node in the tree (represented by a conventional plus sign "+") to reveal its child node contents. To perform this function, the management system 102 may access information to determine the child nodes associated with a parent node selected by the user 108. In this particular case, the user 108 has expanded an "event viewer" tool node 206, to reveal different categories of events that can be perused by the user 108 (e.g., application events, security events, and system events).

A result pane 204 (also commonly referred to as a detail pane) provides more detail regarding an identified node in the scope pane 202. For example, in the example of FIG. 2, the user 108 has selected a node 208 corresponding to a tool that provides system events. Upon selecting this node 208, the management system 102 responds by presenting detail pertinent to this node 208, which, in this case, corresponds to plurality of system events. The table-type or list-type presentation shown in the result pane 204 is merely one illustrative example; other tools can invoke other kinds of user interface presentations to reveal management information.

FIG. 3 shows one mechanism that allows the user 108 to interact with the main user interface presentation 200. Namely, the management system 102 can be configured such that, when the user 108 activates a particular node, the management system 102 presents a context menu associated with the activated node. In the example of FIG. 3, the user 108 has right-clicked on the system node 208. This prompts the management system 102 to present an associated context menu 302. As shown, the context menu 302 presents a number of options which allow the user 108 to interact with the management system 102. Selection of one or more options in the context menu 302 may invoke respective submenus, as in the case where the user 108 selects a "view" option, which prompts the management system 102 to present a submenu 304 relating to the view topic. In the context of a configuration-related application, the context menu options can permit the user 108 to define or modify configuration information which will govern the operation of the target functionality 104.

The main user interface presentation 200 may also serve as a portal for several other kinds of supplemental user interface presentations that work in conjunction with the main user interface presentation 200. Consider the example of FIG. 4. Here, the user 108 has clicked on a particular entry 402 in the result pane 204. In this particular example, the user 108's action prompts the management system 102 to display a supplemental user interface presentation 404 that provides more information regarding the selected entry 404. The particular type of the supplemental user interface presentation 404 shown in FIG. 4 is merely illustrative. Other management systems can invoke user interface presentations having multiple tabbed pages (where the user 108 can select any page in any order in one of these presentations by activating its associated tab). Still other management systems can invoke wizard-type user interface presentation (where the user 108 is restricted to interacting with the pages of one of these presentations in a predefined order). Moreover, the illustrative supplemental user interface presentation 404 shown in FIG. 4 merely displays information regarding the selected entry 402. But other supplemental user interface presentations (not shown) can allow the user 108 to enter information into the management system 102, e.g., via one or more appropriately configured dialog boxes. In the context of a configuration application, the user 108 can use these supplemental user interface presentations to enter information used to modify information stored in a configuration database. To facilitate discussion, all such supplemental user interface presentations are referred to herein as "dialog-related user interface presentations."

Returning to FIG. 1, as mentioned, the management system 102 can rely on a collection of resources 106 to provide the logic which implements different management system applications. In actual practice, a programmer can go about developing code for a particular management system application by separately providing code that implements each node of the application. For each node, this code can implement data retrieval tasks, data presentation tasks, user interaction-related tasks, and so forth. A programmer can create other resources to provide the type of dialog-related user interface presentations shown in FIG. 4.

In conventional practice, the code developed to implement different management system applications represents independent logic. For example, at runtime, a management system application X can be implemented by a first collection of code, while a management system application Y can be implemented by a second collection of code, where the first collection of code is independent and autonomous from the second collection of code. As in any programming context, it is true that a programmer can rely on common building blocks to develop different applications. But the programmer nevertheless goes about the task of developing the code for each application on an individual basis, manually integrating and adapting any common code modules into each application on an ad hoc basis so that these modules properly interact with the rest of the application.

The same design philosophy applies to the creation of dialog-related user interface presentations. Different dialog-related user interface presentations (such as different wizard-type presentations) represent independent and autonomous UI resources. A programmer may draw from common building blocks in constructing dialog-related user interface presentations. Nevertheless, the programmer otherwise goes about the task of developing each dialog-related user interface presentation on an individual basis in the manner described above, e.g., by manually integrating and adapting common UI resources into each unique dialog-related presentation on an ad hoc basis.

As recognized by the present inventors, the above-described approach to writing code and developing dialog-related user interface presentations has several drawbacks. First, the above-described approach is time-consuming, perhaps requiring a week or more to write the code for a single node. Second, the above-described approach may provide management system code and associated dialog-related user interface presentations which lack uniformity from one application to the next; this, in turn, may make it more difficult to understand the code, and hence to debug and/or upgrade it. Third, the above-described approach implements a management system application at runtime using a large amount of code that is specifically adapted to work with only that application (there being no sharing of code among different management system applications). This results in various storage-related and performance-related inefficiencies. The above-described approach to developing dialog-related user interface presentations has similar drawbacks.

For at least the above-identified reasons, there is an exemplary need for more satisfactory strategies for building management systems, including dialog-related user interface presentations used to interact with the management systems (as well as other applications).

SUMMARY

According to one exemplary implementation, a management system is described that makes use of description language content. The description language content includes: (a) first description language content which governs a manner of populating management information to be presented by the management system; (b) second description language content which governs a manner of presenting retrieved management information; and (c) third description language content which governs a manner whereby a user can interact with management information presented by the management system. The system also comprises generic resource content for performing at least one generic task of the management system. The system also comprises functionality for implementing the management system based on a combination of the description language content and the generic resource content, wherein the description language content tailors the generic resource content to provide the management system.

Additional exemplary implementations are described in the following.

BRIEF DESCRIPTION OF THE DRAWINGS

FIGS. 8 and 9 show exemplary strategies for adapting a master schema and a master user interface (UI) template for use in different local and user environments.

FIG. 12 shows an exemplary computer environment for implementing aspects of the management system of FIG. 5.

FIGS. 13-25 set forth an example of one management system constructed based on the principles set forth in FIGS. 5-12.

Figure 1:
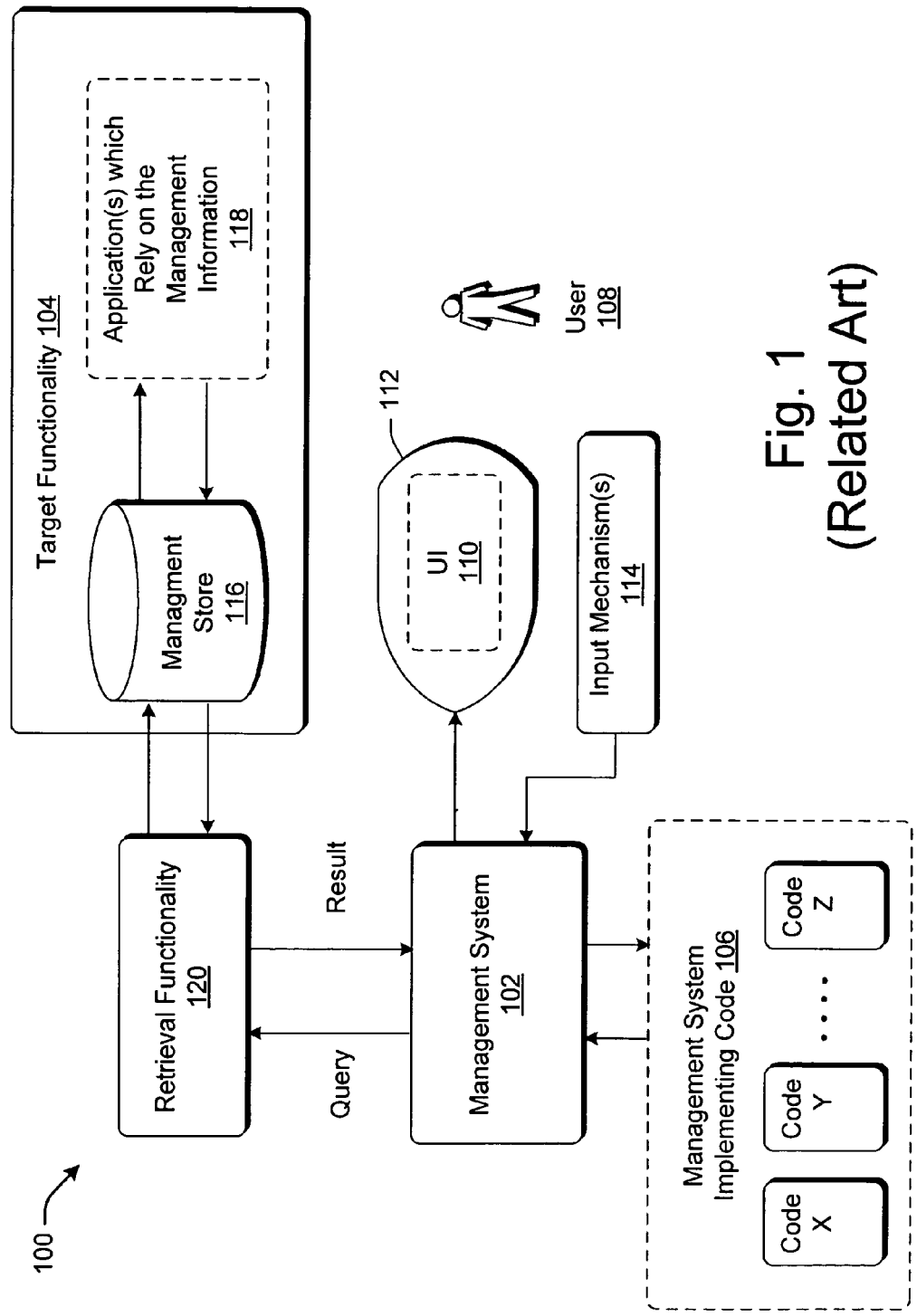
FIG. 1 shows an exemplary system that employs a known management system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

According to one exemplary implementation, the following description sets forth functionality and corresponding procedures for building and deploying a management system. The management system provides description language content (such as markup language content) which describes different aspects of the management system in a declarative manner. The management system also includes generic resource content for performing various general purpose tasks that can be applied to different applications of the management system. The management system provides a specific management-related service by combining the description language content with the generic resource content. In other words, the description language content effectively tailors the generic code content to provide the management-related service. One aspect of the description language content governs a manner of populating management information to be presented by the management system. Another aspect of the description language content governs a manner of displaying the retrieved management information to a user. Another aspect of the description language content governs a manner whereby the user can interact with displayed management information.

According to another exemplary aspect, this disclosure also sets forth a system for building a dialog-related user interface presentation. The dialog-related user interface presentation can be employed in the above-described management system, but is not limited to this environment. The system includes description language content (such as markup language content) which describes different aspects of the dialog-related user interface presentation. The system also includes generic resource content for providing various general purpose user interface resources that can be used in different dialog-related user interface presentations. The system provides the specific dialog-related user interface presentation by combining the description language content and the generic resource content. In other words, the description language content effectively tailors the generic resource content to provide the specific dialog-related user interface presentation. One aspect of the description language content defines the type of the dialog-related user interface presentation that is to be deployed. Another aspect of the description language content describes a manner of arranging (or otherwise deploying) parts of the dialog-related user interface presentation. Another aspect of the description language content defines default content that is provided by the dialog-related user interface presentation. Another aspect of the description language content describes validation rules used to validate information input by a user via the dialog-related user interface presentation.

The systems set forth herein have a number of advantages over the known approaches described in the Background section. For example, the systems set forth herein implement management functionality (and associated dialog-related user interface presentations) in a more efficient and convenient manner than known approaches. Namely, the systems described herein allow a user to construct management functionality by simply defining the features of this functionality in a declarative manner, that is, by writing markup code which defines the desired features. This has the effect of implementing the management functionality without requiring onerous and time-consuming construction of the complex code "from scratch" (as is in the case in conventional approaches). The strategies described herein also reduce the amount of code that is required to implement the management functionality, as each application of the management system draws from a common library of generic resources at runtime without having to duplicate the code for each respective application.

Additional features and attendant benefits of the strategies will be set forth in this description.

As to terminology, the term the "management system" refers to any system that allows a user to inspect management information associated with target functionality, and optionally perform actions with respect to that management information. In one particular example, the management system corresponds to functionality which allows the user to investigate the configuration of the target functionality and modify the configuration. Certain examples in this disclosure are based on user interface features commonly used in Microsoft Corporation's Management Console (MMC); however, the principles described herein can be applied to any kind of management system. For instance, another kind of management system can comprise any kind of functionality that "sits on top" of a data store (e.g., a database) and is used by a user as a tool to interact with information stored in the data store.

Broadly stated, a management system is any functionality that allows a user to interact with data from one or more sources.

The term "management information" refers to any information which has a bearing on the management of a computer system, including, but not limited to, configuration information. That is, in the exemplary context of a configuration application, the management information can pertain to configuration information which governs the operation of the computer system. The configuration information can comprise various settings, security information, pointers, and so forth.

The term "target functionality" refers to any entity that is a "target" of the operations of the management system. Target functionality may comprise one or more applications implemented by one or more computer units.

The term "retrieval functionality" refers to any aspect of the technology used to retrieve information from a source (or sources) (e.g., from the target functionality), including specific retrieval tools/mechanisms, protocols, languages, and so forth.

The term "description language content" refers to any manner of expressing information in a declarative manner (e.g., by providing markup text which describes features of the management system), as opposed to the use of conventional computer instruction code. The description language that is most commonly evoked in this discussion is the Extensible Markup Language (XML).

As mentioned, the term "dialog-related user interface presentation" is used within this disclosure to encompass a wide array of user interface presentations designed to impart specific information to a user and/or to collect specific information from a user. One type of dialog-related user interface presentation comprises a tabbed user interface presentation that has multiple tabs used to invoke multiple respective pages, any of which can be selected by a user at will. Another type of dialog-related user interface presentation comprises a wizard-type user interface presentation that presents multiple pages in a defined sequence. Many other kinds of dialog-related user interface presentations are possible. In the featured implementation, the dialog-related user interface presentation defines a supplemental user interface presentation that can be invoked within the context of a main user interface presentation provided by a management system (as in the example of the user interface presentation 404 of FIG. 4). However, other kinds of applications can deploy dialog related user interface presentations using the unique strategies described herein. Or a computer system can provide these dialog-related user interface presentations in a "standalone" manner outside the context of any application.

This disclosure includes the following sections. Section A presents an exemplary system that uses a management system to interact with management information. Section B presents two flowcharts which describe the operation of the system of Section A. Section C describes an exemplary computer environment for implementing aspects of the system of Section A. Section D sets forth examples of the system of Section A.

A. Exemplary System (FIGS. 5-9)

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the terms "logic," "module," "functionality," or "machine-readable code" represent any kind of program code or other instruction-based content that performs specified tasks when executed on a processing device or devices (e.g., CPU or CPUs). In the exemplary and non-limiting case of a .NET-related implementation, code modules can be configured as managed code, unmanaged code, or a combination of managed and unmanaged code.

The program code can be stored in one or more machine readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Overview of the Management System

Figure 5:
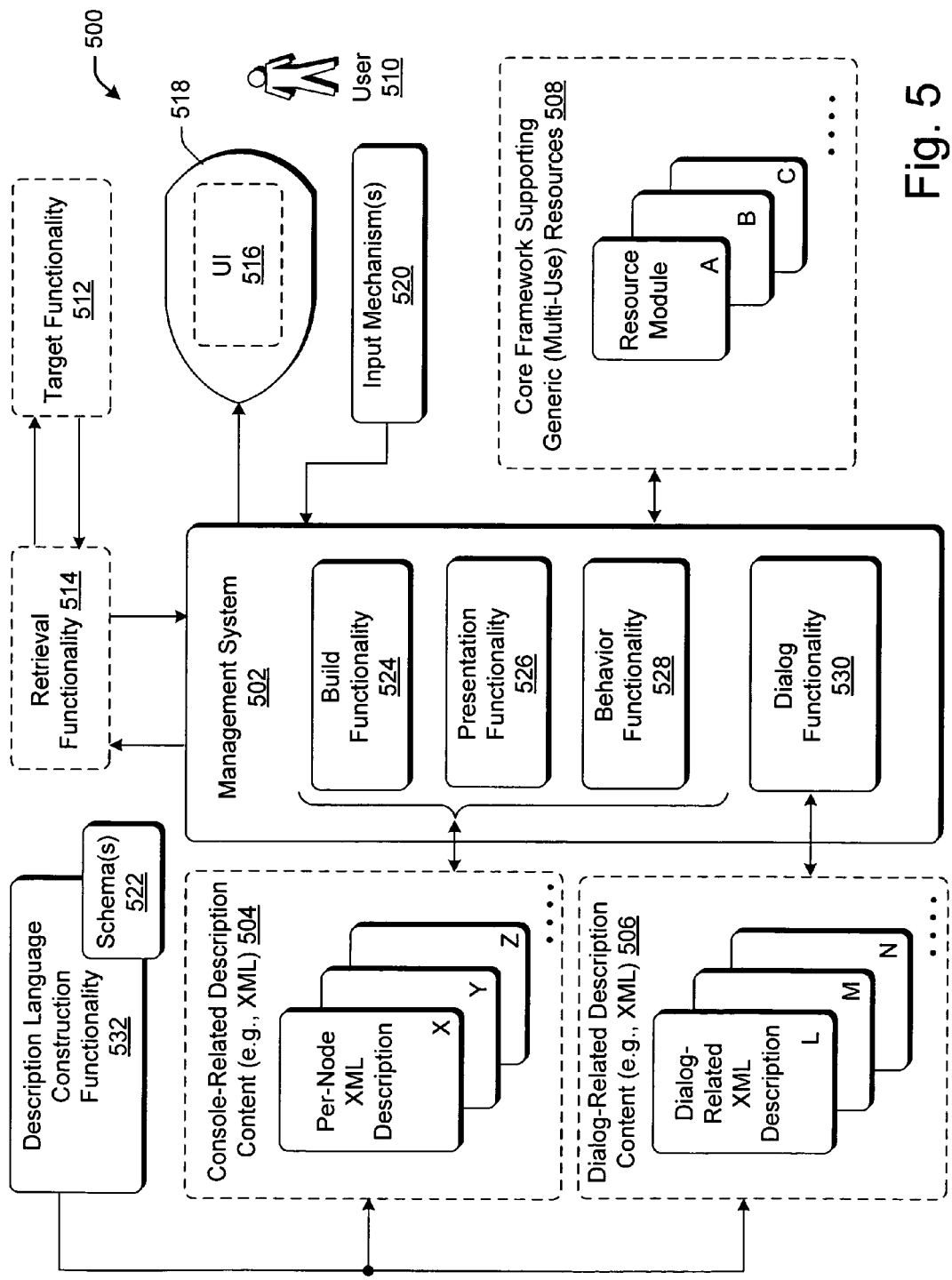
FIG. 5 shows an exemplary system that employs a description language enabled management system according to the present invention.

FIG. 5 shows a system 500 that includes a description language enabled management system 502 (or simply a "management system" 502 henceforth for brevity). The management system 502 provides management-related services by combining declarative information specified in description language content (504, 506) with generic resources provided by generic resource content 508. The description language content (504, 506) effectively tailors (or adapts) the general purpose resources in the generic resource content 508 to implement specific management-related services. A user 510 can thereby build the management system 502 by simply creating description language content in a well structured and easily understood manner, whereupon the description language content will invoke appropriately referenced generic resource content 508. This is in contrast to performing the potentially onerous and time-consuming task of directly assembling code and user interface resources from "scratch" in an ad hoc and manual manner (as in the known approaches previously described). Different applications of the management system 502 also rely on the same core framework of generic resource content 508, thus yielding a much more efficient strategy for building different management system applications compared to known approaches. Various features of the system 500 will be set forth in greater detail below.

By way of overview, the management system 502 interacts with target functionality 512 via retrieval functionality 514 in the basic manner set forth in connection with FIG. 1. More specifically, one exemplary purpose of the management system 502 is to query the target functionality 512 via the retrieval functionality 514 to extract management information from one or more stores (not shown) provided by the target functionality 512.

The target functionality 512 can represent one or more applications implemented by a standalone computer unit, or a system comprising multiple computer units and/or other equipment (such as a server system and associated data stores). Moreover, the target functionality 512 can be implemented at a site which is local to or remote from the management system 502. In the latter case, the management system 502 can interact with the target functionality 512 via any kind (and any combination) of coupling mechanism, such as point-to-point coupling mechanism, local area network, wide area network, and so forth. If implemented as a network interconnection, the coupling mechanism can rely on any combination of hardwired or wireless links, various gateways, routers, and so forth.

In an environment that relies on a Windows™ operating system, the retrieval functionality 514 can rely on Windows Management Instrumentation (WMI) technology. Alternatively, or in addition, the retrieval functionality 514 can also rely on, in whole or in part, SQL-related technology, Active Directory technology, and so forth. Queries sent to the target functionality 512 can be configured to declaratively specify where the sought-after management information is to be found, as well as the technology (or technologies) used to retrieve the management information.

As previously described, the user 510 can interact with the management system 502 via a series of user interface presentations 516 provided on a display device 518 (such as a CRT device, LCD device, etc.), in conjunction with an input mechanism 520 (such as a keyboard, a touch screen, a mouse-type pointing device, a joystick, and so forth).

The description language content (504, 506) can be expressed in a markup language, such as the Extensible Markup Language (XML). XML is a subset of the Standard Generalized Markup Language (SGML) that enables developers to create customized tags that describe the meaning of data, as opposed to the presentation of data. An XML document is composed of XML elements, each of which includes a start tag (such as <Queries>), an end tag (such as </Queries>), and information between the two tags (which is referred to as the content of the elements). An element may include any number (including zero) of name-value pairs (referred to as attributes) related by an equal sign that modifies certain features of the element (such as MONTH="May"). Elements in an XML document can have a hierarchical relationship to each other that can be represented as a data tree. A so-called XML schema 522 provides a formal specification that defines the types of elements and the organization of elements that should appear in an XML document in order for that document to be considered so-called well formed.

In contrast, the generic resource content 508 can be expressed in a machine-readable code language, such as C#, Visual Basic.NET, JScript.NET, C++ with Managed Extensions, and so on. The resource content 508 is specifically configured so that it can be "plugged into" different management system applications, as governed by description language information set forth in the description language content (504, 506). Other generic resource content 508 provides general-purpose building blocks used to construct dialog-related user interface presentations (to be described).

In other words, the solution described herein involves extracting variations in code resources and user interface resources from common features of the code resources and user interface resources, and expressing the variations in a descriptive manner in the description language content (504, 506).

With the above introduction, it is possible to delve into the functions provided by the management system 502 in greater detail. The description language content (504, 506) includes two components. A first component defines console-related description language content 504. The console-related description language content 504 provides descriptive information which governs the building of the management system 502. Namely, a first aspect of this description language content 504, when combined with appropriately referenced generic resource content 508, provides build functionality 524. The build functionality 524 performs the core task of querying the target functionality 512 to extract management information from appropriate stores. In the context of the MMC-type user interface presentation 200 shown in FIG. 2, the build functionality 524 supplies the necessary management information to construct the nodes of the scope pane 202 and the detailed information within the result pane 204.

A second aspect of the console-related description language content 504, when combined with appropriately referenced generic resource content 508, provides presentation functionality 526. The presentation functionality 526 performs the core task of presenting the management information that has been extracted by the build functionality 524. In the context of the MMC-type user interface presentation 200 shown in FIG. 2, the presentation functionality 526 provides the instructions which govern the manner in which the management information is displayed to a user. For example, the management system 502 can display the same management information to a user in different formats, such as a simplified format and an expert format (and so forth). In this case, the presentation functionality 526 governs the format used to present the management information. The presentation functionality 526 can also specify various particulars of the presentation, such as, for instance, by specifying the textual and iconic information which is presented to identify different nodes in the scope pane 202 and the result pane 204, and so forth.

A third aspect of the console-related description language content 504, when combined with appropriately referenced generic resource content 508, provides behavior functionality 528. The behavior functionality 528 specifies the manner in which the user 510 is allowed to interact with the management information that has been presented by the presentation functionality 526. Namely, the behavior functionality 528 can govern the action options that are presented to the user 510, as well as the types of operations which these actions respectively invoke. Consider the MMC-type user interface presentation shown in FIG. 3. In this case, the behavior functionality 528 is used to govern the types of options that are presented by the context menus (302, 304), as well as the types of operations which these options respectively invoke when selected.

On the other hand, a second component of the description language content (504, 506) defines dialog-related description language content 506. The dialog-related description language content 506 provides descriptive information which, when combined with appropriately referenced generic resource content 508, yields dialog functionality 530. The purpose of the dialog functionality 530 is to provide the types of supplemental user interface presentations shown in FIG. 4. As previously stated, these types of displays are also generically referred to herein as "dialog-related user interface presentations." The dialog-related user interface presentations can be invoked when the user 510 activates items within the context menus presented by the main user interface presentation or when the user makes other appropriate selections in interacting with the management system 502.

More specifically, the dialog-related description language content 506 provides descriptive information that governs the manner in which general purpose UI building blocks in the generic resource content 508 are adapted to provide specific dialog-related user interface presentations. (However, the dialog-related description language content 506 does not create the UI building blocks themselves from scratch, this being the responsibility of other functionality which is not the topic of this disclosure.)

Exemplary and non-limiting different aspects of the description language content 506 are enumerated as follows. A first aspect of this content 506 allows the user 510 to specify a type of dialog-related user interface presentation that is to be invoked. For instance, assume that the purpose of an exemplary dialog-related user interface presentation is to collect configuration information from the user 510 using a collection of user interface pages. The management system 502 can potentially collect this information from the user 510 using different UI paradigms (corresponding to different user interface "shells"). For example, in a first scenario, the management system 502 can provide a dialog-related user interface presentation that provides the multiple pages to the user 510 in a tabbed arrangement, permitting the user 510 to select any page in the collection of pages at will and in no particular order (by activating an appropriate tab). In a second scenario, the management system 502 can provide a dialog-related user interface shell that presents the multiple pages in an ordered sequence, e.g., in a wizard-type format, thereby requiring the user 510 to sequence through the pages in a defined order. These are merely illustrative examples, not exhaustive of the range of dialog-related user interface presentations that can be deployed. In any event, the first aspect of the dialog-related description language content 506 specifies the type of display that is to be invoked by a particular management system 502. Particular types of user interface shells and resources can be specified by providing ID information associated with these shells and resources.

A second aspect of the dialog-related description language content 506 allows the user 510 to specify the manner in which pages are arranged within a particular dialog-related user interface shell. For example, assume that the management system 502 solicits information from the user 510 using a wizard-type user interface presentation. The second aspect of the dialog-related description language content 506 can specify the order of pages within the wizard-type presentation, and other related features of the wizard-type presentation that affects its general design plan (e.g., by enabling or displaying branching within the wizard-type presentation, and so forth). For example, the dialog-related description language content 506 can define a branch within a wizard that contingently depends on the user 510's input; for example, if the user 510 selects a radio button $B_1$ in a wizard page $P_1$, then the wizard will display a subsequent page $P_{2-a}$, but if the user selects a radio button $B_2$ in the wizard page $P_1$, then the next page will be $P_{2-b}$, and so forth. The content 506 can specifically define, in a declarative manner, whether such branching is enabled or disabled, the nature of events which trigger the branching, the destinations of the branching (e.g., the "go to" pages), and so forth.

In one implementation, the content 506 can define the order of pages within a wizard by specifying such pages in a defined sequence within the content 506. Appendix D provides an example of XML content which implements a wizard having multiple pages to illustrate this feature.

A third aspect of the dialog-related description language content 506 allows the user 510 to specify whether parts of the dialog-related user interface presentation are to be enabled or disabled. In one scenario, the particular parts may correspond to whole pages within a multi-page dialog-related user interface presentation. In another scenario, the particular parts may correspond to fields within a single page. As will be described, the decision to enable or disable parts of a dialog-related user interface presentation can be contextual. For instance, a dialog-related user interface presentation may invoke a particular part of its display when it is used in the context of a first tool, but may not invoke the same part when it is used in the context of a second tool. Recall that a tool being invoked corresponds to a node within the scope pane. Hence, the context in which a tool is invoked is reflected by its corresponding node's relationship vis-à-vis its parent and ancestor nodes (if they exist) within the scope node tree. Parts of a dialog-related user interface presentation that are disabled can be entirely omitted, "grayed out" (to indicate that they are inactive), or presented (or not presented) in some other manner.

A fourth aspect of the dialog-related description language content 506 allows the user 510 to specify default content which is presented in the dialog-related user interface presentation and/or default behavior which is exhibited by the dialog-related user interface presentation. Namely, this aspect can be used to automatically populate the dialog-related user interface presentation with default information when it is initially presented to the user 510, and/or when the user fails to manually fill out prescribed fields in the dialog-related user interface presentation. Alternatively, or in addition, this aspect can be used to specify whether certain user interface fields (such as various check boxes, radio buttons, edit controls, etc.) are checked or unchecked.

A fifth aspect of the dialog-related description language content 506 allows the user 510 to specify validation rules which govern the types of input that the management system 502 will accept for different input fields. Different rules may apply to different applications. Common rules specify: (a) a maximum or minimum number of characters that can be input; (b) permissible types of characters which can be input; (c) required fields of information that must be input (verses optional fields); (d) permissible sequences of input operations, and so forth. Different mechanisms can be used to implement validation rules, such as a so-called regular expressions technique.

Later sections provide additional details regarding the above-summarized functionalities (524, 526, 528, 530). Further, the Appendix (Section D and associated FIGS. 13-25) provides examples of markup code that can be used to provide the description language content (504, 506) for one specific and non-limiting application.

Continuing with the discussion of FIG. 5, this figure shows content construction functionality 532. The content construction functionality 532 is used to construct the description language content (504, 506). In one implementation, the content construction functionality 532 can comprise an editing-type program which is configured to facilitate the creation of XML content (or other kind of description language content). For instance, the content construction functionality 532 can provide various automated routines and other time-saving provisions for entering XML content. The content construction functionality 532 can also provide various error checking provisions which ensure that the XML content obeys the schema(s) 522. In one case, a first schema defines the proper construction of the console-related description language content 504, and a second schema defines the proper construction of the dialog-related description language content 506. As will be described below in connection with FIGS. 8 and 9, company-specific and user-specific schemas can also be provided which alter the master schemas 522 in various respects to suit the requirements of local and user environments.

It should be noted that the above-described functionalities (524, 526, 528, 530) are shown as being deployed within the context of the management system 502, which is the preferred implementation set forth in this description. However, such functionalities (524, 526, 528, 530) can also be used in other applications (that is, in applications other than management and configuration-related applications). In other words, the unique combination of declarative content and generic resource content can be used to simplify the programming of other applications. To name one example, the query-based build functionality 524 can be used to interact with any repository of information, such as a SQL database. To name another example, the dialog functionality 530 can be used to provide dialog-related user interface presentations (such as wizard-type presentations) in the context of any application, including any kind of high-end user application (such as a word processing programming, etc.), an operating system application, and so forth. Stated in another way, the user 510 can invoke the dialog functionality 530 outside the context of the kind of MMC main user interface presentation 200 shown in FIG. 2.

In terms of physical implementation, the management system 502 can be implemented as hardware and/or software implemented by any kind of computer device, such as a personal computer device, personal digital assistant (PDA) device, intelligent mobile phone device, any kind of transportable or wearable computer device, any kind of game console device (such as Microsoft Corporation's Xbox™ game consoles), and so on. Where the management system 502 is implemented by some kind of computer device, FIG. 12, to be discussed in turn, provides one exemplary computer environment for implementing the management system 502. The management system 502 can be implemented in the same system that implements the target functionality 512, or the management system 502 can be implemented in a system that is separate from (but coupled to) the target functionality 512.

Figure 6:
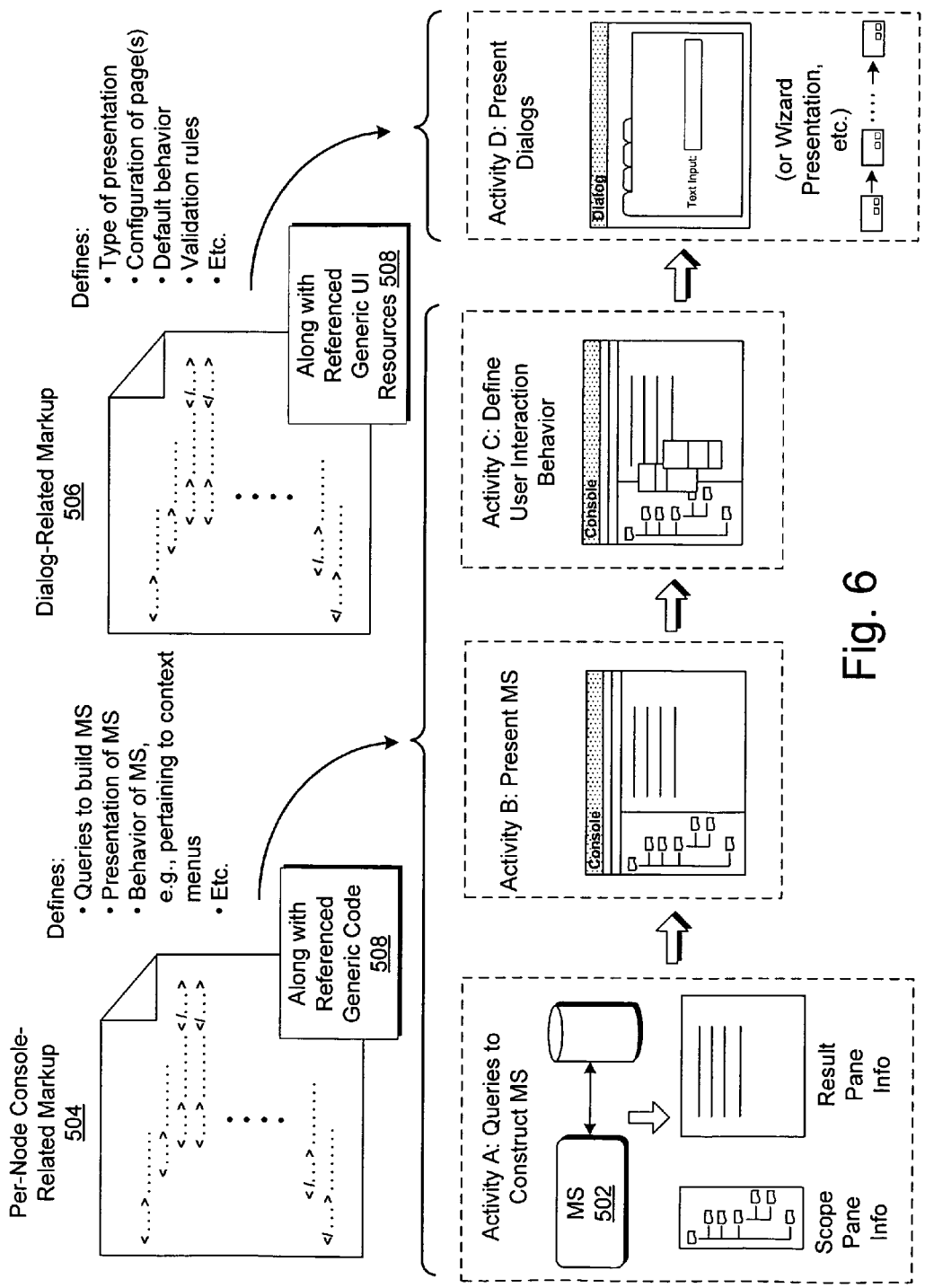
FIG. 6 provides another exemplary depiction of the management system of FIG. 5.

FIG. 6 summarizes the concepts set forth above in the context of FIG. 5. As indicated in that figure, console-related description language content 504 combines with generic resource content 508 to yield uniquely-tailored code that implements a number of activities. (In this context, the generic resource content 508 represents multi-purpose code content that can be used to construct different management system applications.) A first activity (A) uses the description language content 504 to populate the management information in the scope pane and the result pane of the main user interface presentation (e.g., refer back to FIG. 2 for an example of these panes). This activity can comprise forwarding one or more queries to a management store maintained by the target functionality 512. A second activity (B) uses the description language content 504 to govern the manner in which the thus-collected management information is presented to the user 510. A third activity (C) governs the manner in which the user 510 is permitted to interact with the management information, and the types of operations which are invoked by the user 510's interaction.

On the other hand, dialog-related description language content 506 combines with generic resource content 508 to yield uniquely-tailored dialog-related user interface presentations. (In this context, the generic resource content 508 represents UI building blocks used to construct different dialog-related user interface presentations.) The fourth activity (D) shown in FIG. 6 describes the creation of such dialog-related user interface presentations.

For convenience of explanation, FIG. 6 illustrates the series of activities (A-D) as a chain performed in a defined sequence. But this embodiment is merely exemplary. Different activities can be invoked by different actions made by the user 510 in interacting with the management system 502; for this reason, the activities shown in FIG. 6 can be performed in an order which differs from that shown in FIG. 6.

A.2. The Role of the Console-Related Description Language Content

With the above introduction, the following subsection provides additional explanation regarding the console-related description language content 504. Generally, the console-related description language content 504 controls the building of the management system 502, and implements the build functionality 524, the presentation functionality 526, and the behavior functionality 528 of FIG. 5.

Figure 2:
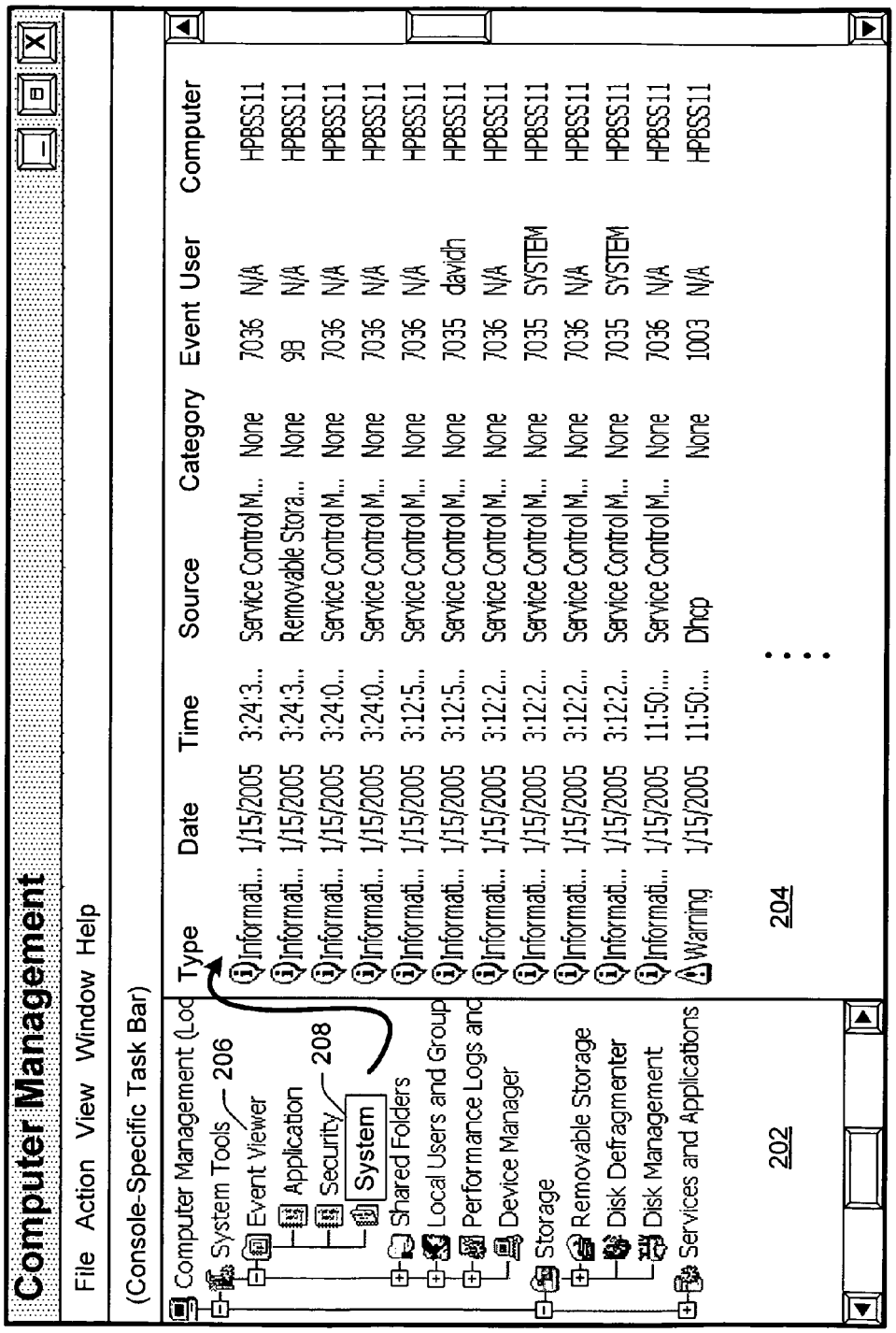
FIGS. 2-4 show exemplary user interface presentations that can be provided by the known management system of FIG. 1.
Figure 3:
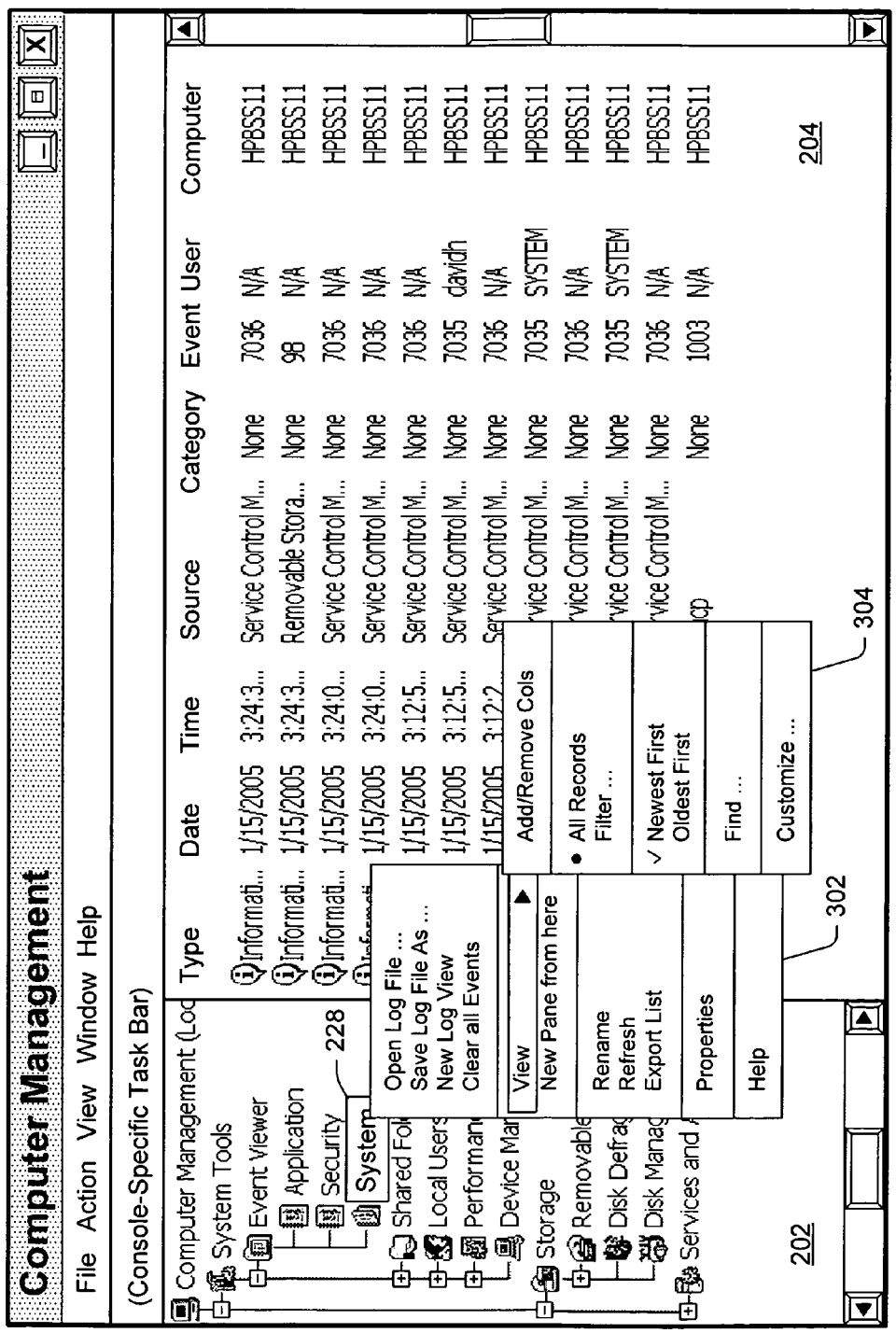
Figure 7:
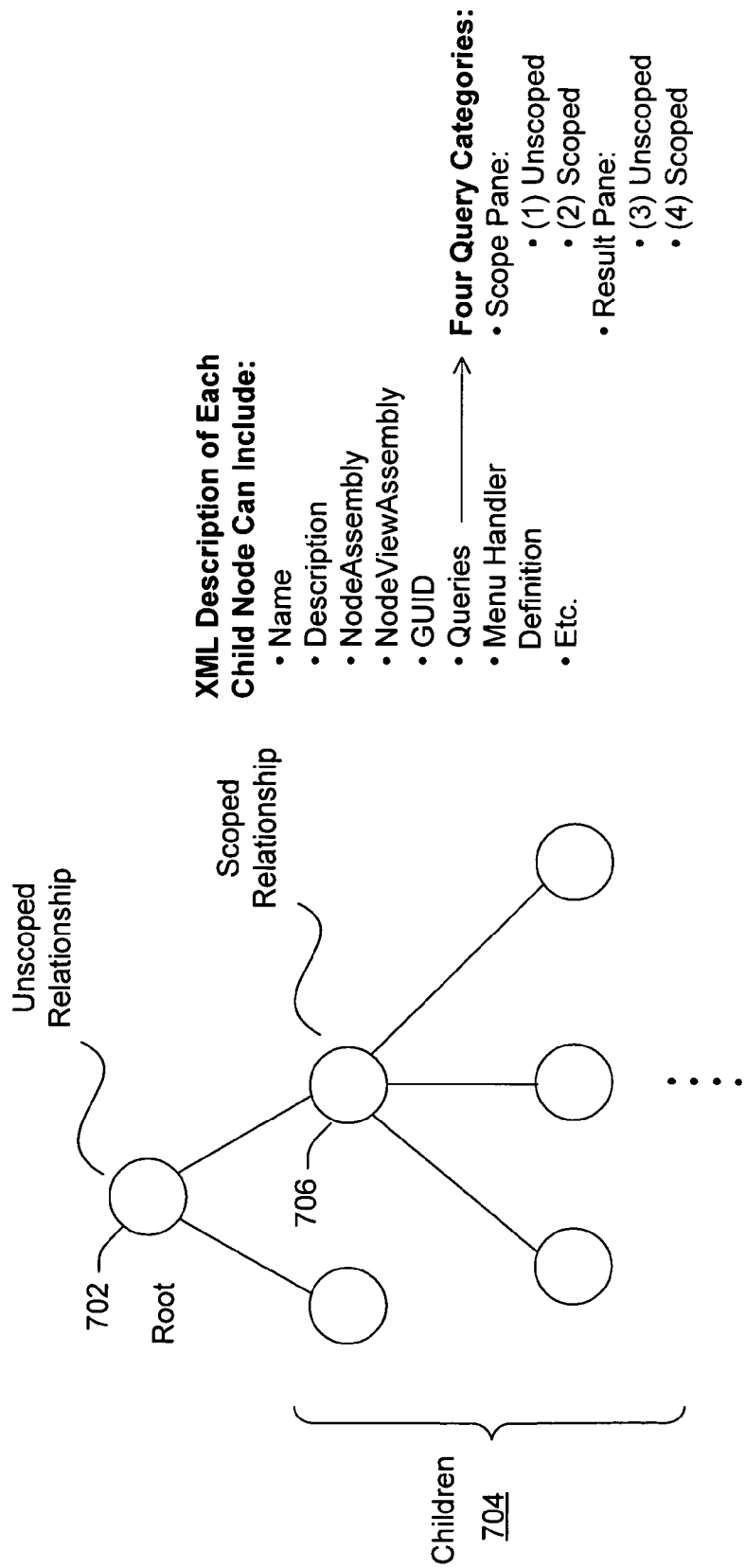
FIG. 7 shows a collection of nodes that can be implemented by the management system of FIG. 5, particularly illustrating the types of description language content items that can be provided for each node in the collection.

In connection with content 504, FIG. 7 shows a collection of nodes that represents an excerpt of a hierarchical tree of nodes which populate a scope pane (e.g., as in the case of the scope pane 202 of FIG. 2's main user interface presentation 200). The collection of nodes has a root node 702. Other nodes that depend from the root node 702 define child nodes 704. That is, for example, node 706 is a child of root node 702 (e.g., root node 702 being its parent). Child node 706, in turn, includes other child nodes which depend from it. In the context of a typical management system 502, the nodes may represent tools or other access portals that the user 510 can activate so as to interact with management information maintained by the target functionality 512.

In one exemplary case, the content construction functionality 532 can be employed to create the console-related description language content 504 on a node-by-node basis. In other words, the user 510 can define the console-related description language content 504 by creating corresponding markup content for each respective tool or portal represented by the scope pane. In this implementation, the content construction functionality 532 can supply a prescribed set of declarative information items for each node. FIG. 7 enumerates one exemplary and non-limiting set of information items that can be associated with each node. Each item of this exemplary set is explained below.

Name. The name information provides a name associated with the node which is conveyed to the user 510 via the management system user interface presentation.

Description. The description information provides a description associated with the node which is conveyed to the user 510.

Node Assembly. The Node Assembly information provides a pointer to executable code content which can be invoked in association with the node. For example, this assembly information can be invoked when the user clicks on a node, for instance, to expand the contents of the node. This approach to populating management information can be used as a replacement for query-driven management information retrieval, or to supplement query-driven management information retrieval. For instance, this mechanism can be used when query-driven retrieval becomes too complex to describe in markup. In addition to populating the data, the accessed assembly code can process the input data fed to the code and/or process the output data supplied by the code.

Node View Assembly. The Node View Assembly information governs the manner in which various information associated with the node is presented to the user 510. More specifically, the View Assembly defines the manner in which the data accessed by a query (or by other means) is presented in the result pane (e.g., in graphical format, text-based format, spreadsheet-based format, and so on). To perform this function, the View Assembly identifies a pointer to code that can be invoked to provide the desired presentation of the data.

GUID. The GUID information defines an ID which is assigned to the node to uniquely identify the node. In an MMC context, the GUID information can be used by developers to "extend" the functionality of the administration console using externally loaded code.

Queries. The query information defines queries that are invoked by the node to retrieve management information from the target functionality 512.

Menu Handler Definition. The menu handler definition information governs the type of options that are presented in context menus, and the corresponding types of operations which are invoked by the options.

The above-identified set of descriptive content items is merely exemplary. Other applications can provide additional items, or can omit one or more items shown in FIG. 7. In any event, as will be described in connection with FIGS. 13-19 in Section D (below), the console-related description language content 504 can demarcate the above-identified descriptive content items using appropriate markup tags.

As previously described, a node's characteristics may be contextual, meaning that attributes of a child node may derive, in part, from that node's parent node or an ancestor node. For instance, the node 706 depends from the node 702, and therefore may inherit attributes associated with node 702. In effect, this means that a query performed with respect to a parent or ancestor node may act so as to populate attribute information for one or more child nodes. For example, consider the case of the menu handler definition item. When displaying a context menu associated with node 706, the management system 502 can display options which locally derive from node 706, as well as options which drive from parent node 702. In other words, the context menu presented for a particular node may depend on the overriding context in which this node (and associated tool) is being employed.

Further, the types of queries that are performed by a node may depend on the node's position within the hierarchy of nodes. As enumerated in FIG. 7, a node may enable two kinds of queries to supply management information to populate the scope pane, and enable another two kinds of queries to supply management information for the result pane. In each of these categories, one query is enabled for the case in which the corresponding node is "unscoped" (meaning that it has no parent within the tree of nodes that affects the query). Another query is enabled for the case in which the corresponding node is "scoped" (meaning that it has a parent within the tree of nodes that affects the query).

For example, a root node has no parent. Consequently, a query executed on this node to populate its children will constitute an unscoped query. After this operation, each of the child nodes associated with the root node will have a parent (i.e., the root node). Consequently, a query executed on a child node to populate its own children will constitute a scoped query (because the query takes place in the context of the overriding scope of the root node). For example, in a File Explorer application, when the user clicks the c drive (root), a query is run to retrieve the files and folders in the root of (c:\). This constitutes an unscoped query. But when the user then clicks on a folder in the root, another query is run which returns the files/folders under the selected folder. This constitutes a query which is scoped to the selected folder.

Again, the Appendix to this disclosure (in Section D) provides specific examples which demonstrate how the console-related description language content 504 can be implemented in XML.

A.3. Modification of Schemas and Templates to Suit Local and User Environments

FIG. 8 illustrates a manner in which a master schema can be modified to suit various local and user environments. Namely, a product developer can define a master schema 802 which provides a general purpose schema that governs the building of the management system 502 in any environment. However, different organizations (e.g., different companies) may have particular requirements which make certain aspects of the general purpose schema 802 appropriate and other aspects inappropriate. For instance, because of a convention followed by a particular company, that company may mandate that certain management information by collected in a prescribed way, displayed in a prescribed way, and/or interfaced with in a prescribed way. To this end, an administrator of the company can modify the general purpose schema 802 to provide a local setting schema 804 that applies within the local environment. In the same manner, an individual user (or group of users) can further tailor the master schema 802 to suit their unique needs and preferences, to yield a user-specific schema 806.

In an analogous manner, FIG. 9 illustrates how a master user interface template can be modified to suit various local environments. Namely, a product developer can define a master user interface template 902 which sets forth general aspects of a dialog-related user interface presentation. A company administrator can modify the general purpose user interface template 902 to provide a local setting template 904 that applies within the local environment. In a similar manner, an individual user (or group of users) can further tailor the maser UI template 902 to suit their particular needs and preferences, to yield a user-specific UI template 906.

B. Exemplary Method of Operation (FIGS. 10 and 11)

Figure 11:
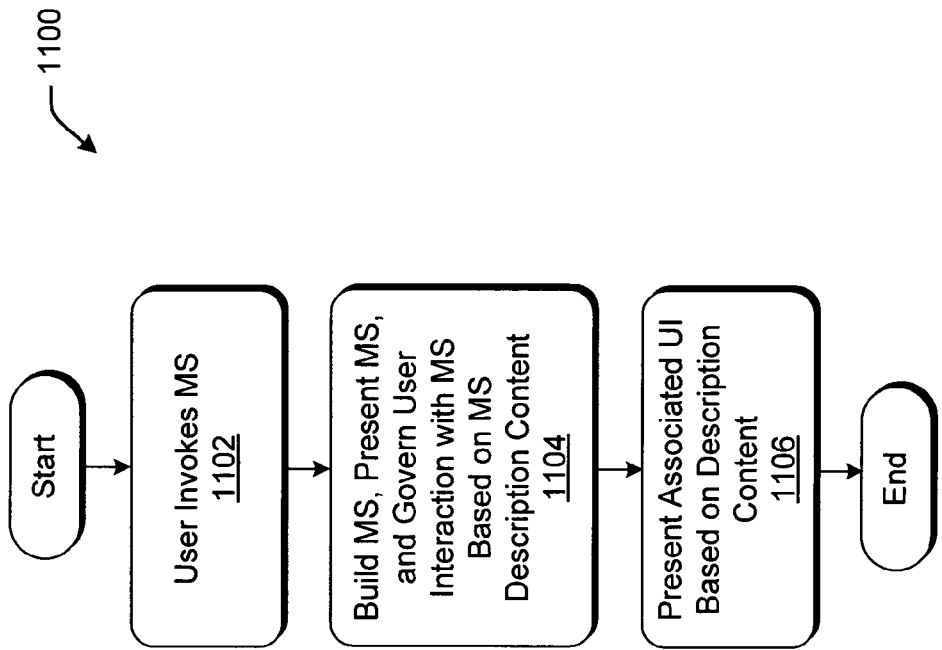
FIG. 11 shows an exemplary procedure that explains the operation of the management system constructed in FIG. 10.
Figure 10:
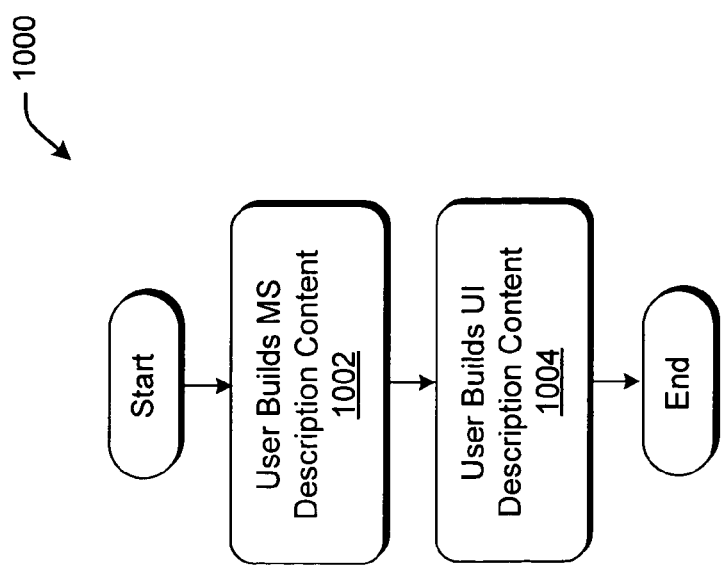
FIG. 10 shows an exemplary procedure for creating the management system of FIG. 5.

FIGS. 10 and 11 together describe procedural aspects of the management system 502 set forth in FIG. 5. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure. As the functions performed by the management system 502 have been fully explained in prior sections, this section will serve primarily as a review of those functions.

In a procedure 1000 of FIG. 10, a first step 1002 entails creating the console-related description language content 504. As described, descriptive XML-based content 504 governs the building of the management system (MS). A second step 1004 entails creating dialog-related description language content 506. This content 506 governs the building of the dialog-related user interface presentations. Different schemas may constraint the development of the console-related description language content 504 and the dialog-related description language content 506.

In a procedure 1100 shown in FIG. 11, a first step 1102 pertains to invocation of the management system (MS) 502 by the user 510. A second step 1104 pertains to building the management system 502 using the build functionality 524, which prompts the retrieval functionality 514 to retrieve management information from the target functionality 512. The second step 1104 also involves presenting the retrieved management information using the presentation functionality 526. The second step 1104 also involves governing the behavior of the user 510's interaction with the management information using the behavior functionality 528. A third step 1106 involves proving dialog-related user interface presentations (e.g., multi-tabbed user interface presentations or wizard-type user interface presentations, and so forth) based on the dialog functionality 530. The steps in the procedure 1100 are shown as being performed in a particular order only to facilitate discussion. In an actual application, the management console 502 may repeat the steps shown in FIG. 11 many times throughout a session in an arbitrary order depending on the user 510's actions.

C. Exemplary Computer Environment (FIG. 12)

In one exemplary implementation, certain aspects of the management system 502 can be implemented as computer code executed by one or more computer devices. In this case, FIG. 12 provides information regarding an exemplary computer environment 1200 that can be used to implement each such computer devices.

The computing environment 1200 includes a general purpose or server type computer 1202 and a display device 1204. However, the computing environment 1200 can include other kinds of computing equipment. For example, although not shown, the computer environment 1200 can include handheld or laptop devices, set top boxes, game consoles, mainframe computers, etc. Further, FIG. 12 shows elements of the computer environment 1200 grouped together to facilitate discussion. However, the computing environment 1200 can employ a distributed processing configuration. In a distributed computing environment, computing resources can be physically dispersed throughout the environment.

Exemplary computer 1202 includes one or more processors or processing units 1206, a system memory 1208, and a bus 1210. The bus 1210 connects various system components together. For instance, the bus 1210 connects the processor 1206 to the system memory 1208. The bus 1210 can be implemented using any kind of bus structure or combination of bus structures, including a memory bus or memory controller, a peripheral bus, an accelerated graphics port, and a processor or local bus using any of a variety of bus architectures.

Computer 1202 can also include a variety of computer readable media, including a variety of types of volatile and non-volatile media, each of which can be removable or non-removable. For example, system memory 1208 includes computer readable media in the form of volatile memory, such as random access memory (RAM) 1212, and non-volatile memory, such as read only memory (ROM) 1214. ROM 1214 includes an input/output system (BIOS) 1216 that contains the basic routines that help to transfer information between elements within computer 1202, such as during start-up. RAM 1212 typically contains data and/or program modules in a form that can be quickly accessed by processing unit 1206.

Other kinds of computer storage media include a hard disk drive 1218 for reading from and writing to a non-removable, non-volatile magnetic media, a magnetic disk drive 1220 for reading from and writing to a removable, non-volatile magnetic disk 1222 (e.g., a "floppy disk"), and an optical disk drive 1224 for reading from and/or writing to a removable, non-volatile optical disk 1226 such as a CD-ROM, DVD-ROM, or other optical media. The hard disk drive 1218, magnetic disk drive 1220, and optical disk drive 1224 are each connected to the system bus 1210 by one or more data media interfaces 1228. Alternatively, the hard disk drive 1218, magnetic disk drive 1220, and optical disk drive 1224 can be connected to the system bus 1210 by a SCSI interface (not shown), or other coupling mechanism. Although not shown, the computer 1202 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1202. For instance, the readable media can store the operating system 1230, application-specific functionality 1232 (including functionality for implementing aspects of the management system 502), other program modules 1234, and program data 1236.

The computer environment 1200 can include a variety of input devices. For instance, the computer environment 1200 includes the keyboard 1238 and a pointing device 1240 (e.g., a "mouse") for entering commands and information into computer 1202. The computer environment 1200 can include other input devices (not illustrated), such as a microphone, joystick, game pad, satellite dish, serial port, scanner, card reading devices, digital or video camera, etc. Input/output interfaces 1242 couple the input devices to the processing unit 1206. More generally, input devices can be coupled to the computer 1202 through any kind of interface and bus structures, such as a parallel port, serial port, game port, universal serial bus (USB) port, etc.

The computer environment 1200 also includes the display device 1204. A video adapter 1244 couples the display device 1204 to the bus 1210. In addition to the display device 1204, the computer environment 1200 can include other output peripheral devices, such as speakers (not shown), a printer (not shown), etc.

Computer 1202 operates in a networked environment using logical connections to one or more remote computers, such as a remote computing device 1246. The remote computing device 1246 can comprise any kind of computer equipment, including a general purpose personal computer, portable computer, a server, etc. Remote computing device 1246 can include all of the features discussed above with respect to computer 1202, or some subset thereof.

Figure 4:
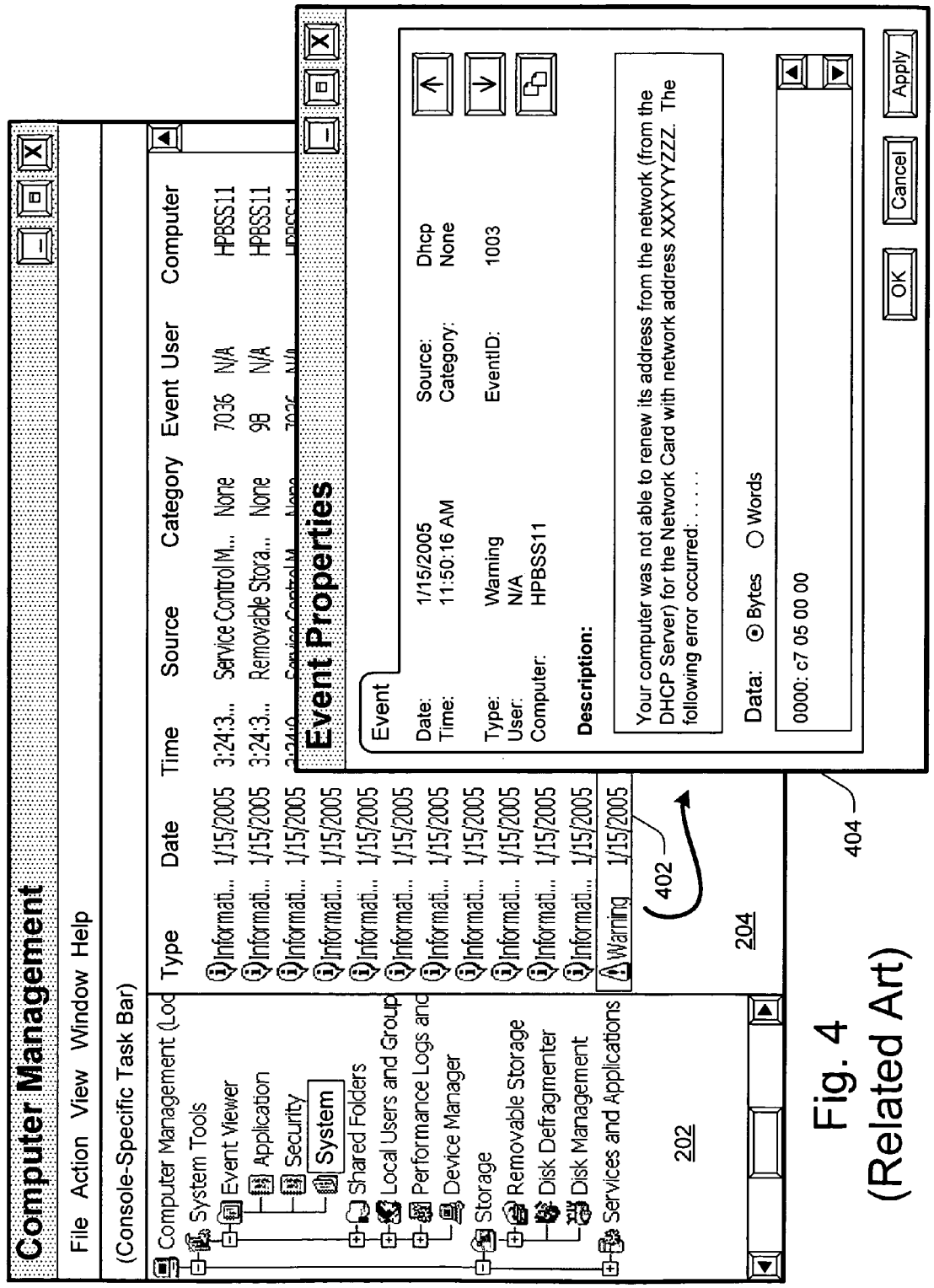

Any type of network 1248 can be used to couple the computer 1202 with remote computing device 1246, such as the WAN 402 of FIG. 4, a LAN, etc. The computer 1202 couples to the network 1248 via network interface 1250 (e.g., the interface 416 shown in FIG. 4), which can utilize broadband connectivity, modem connectivity, DSL connectivity, or other connection strategy. Although not illustrated, the computing environment 1200 can provide wireless communication functionality for connecting computer 1202 with remote computing device 1246 (e.g., via modulated radio signals, modulated infrared signals, etc.).

The above-described computer 1202 can use the management system 502 to manage a target functionality 512 implemented by the computer 702 itself (e.g., where the target functionality 512 may represent a collection of resources maintained by the computer 702). Or the computer can use the management system 502 to manage a target functionality 512 implemented by some remote system, e.g., accessible via network 1248 or some other coupling mechanism.

D. Appendix: Examples (FIGS. 13-25)

FIGS. 13-25 provide examples of description language content (504, 506) and user interface presentations associated with the content.

D.1. Exemplary Management Console XML and Associated UI Presentations

Figure 13:
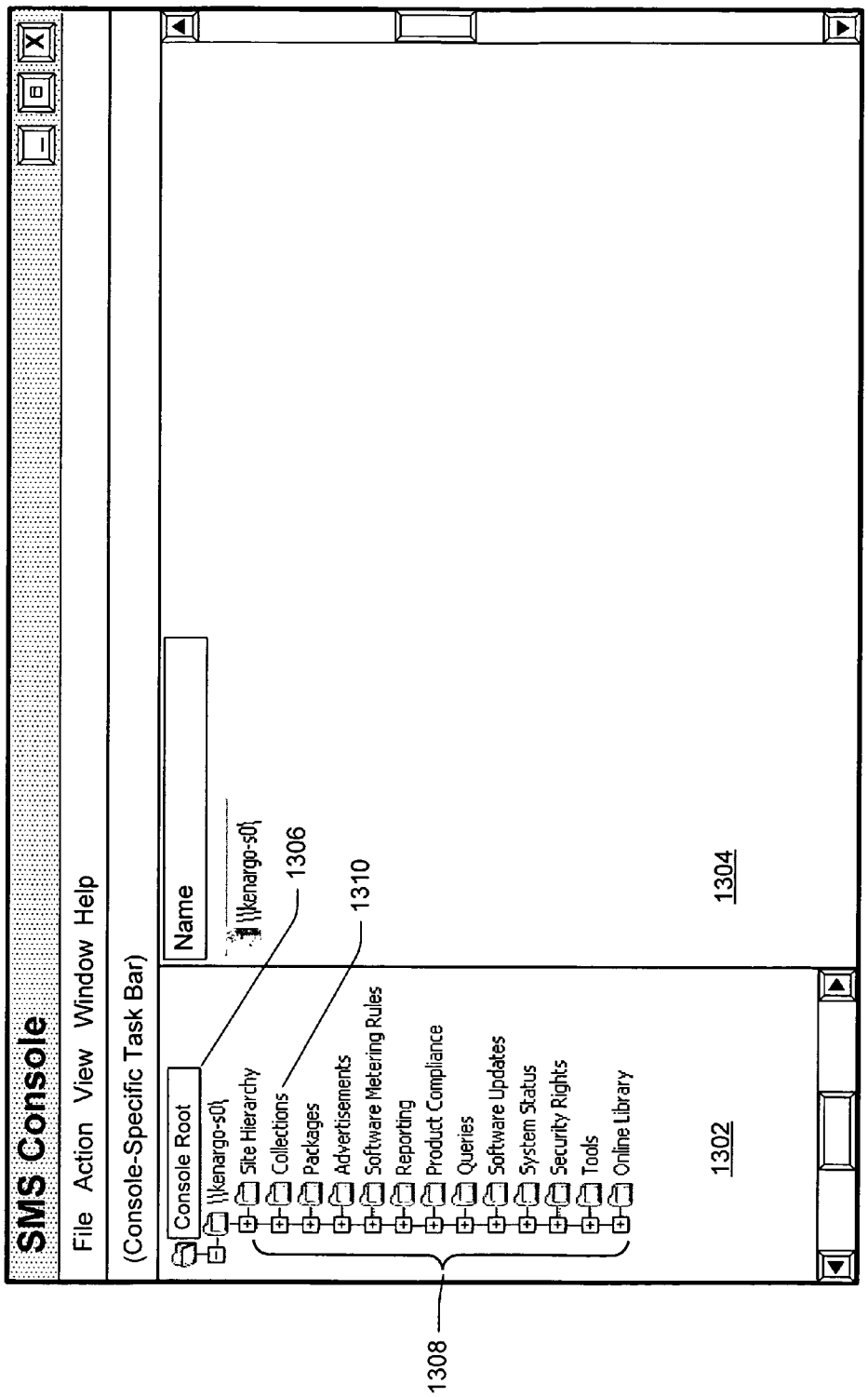
Figure 14:
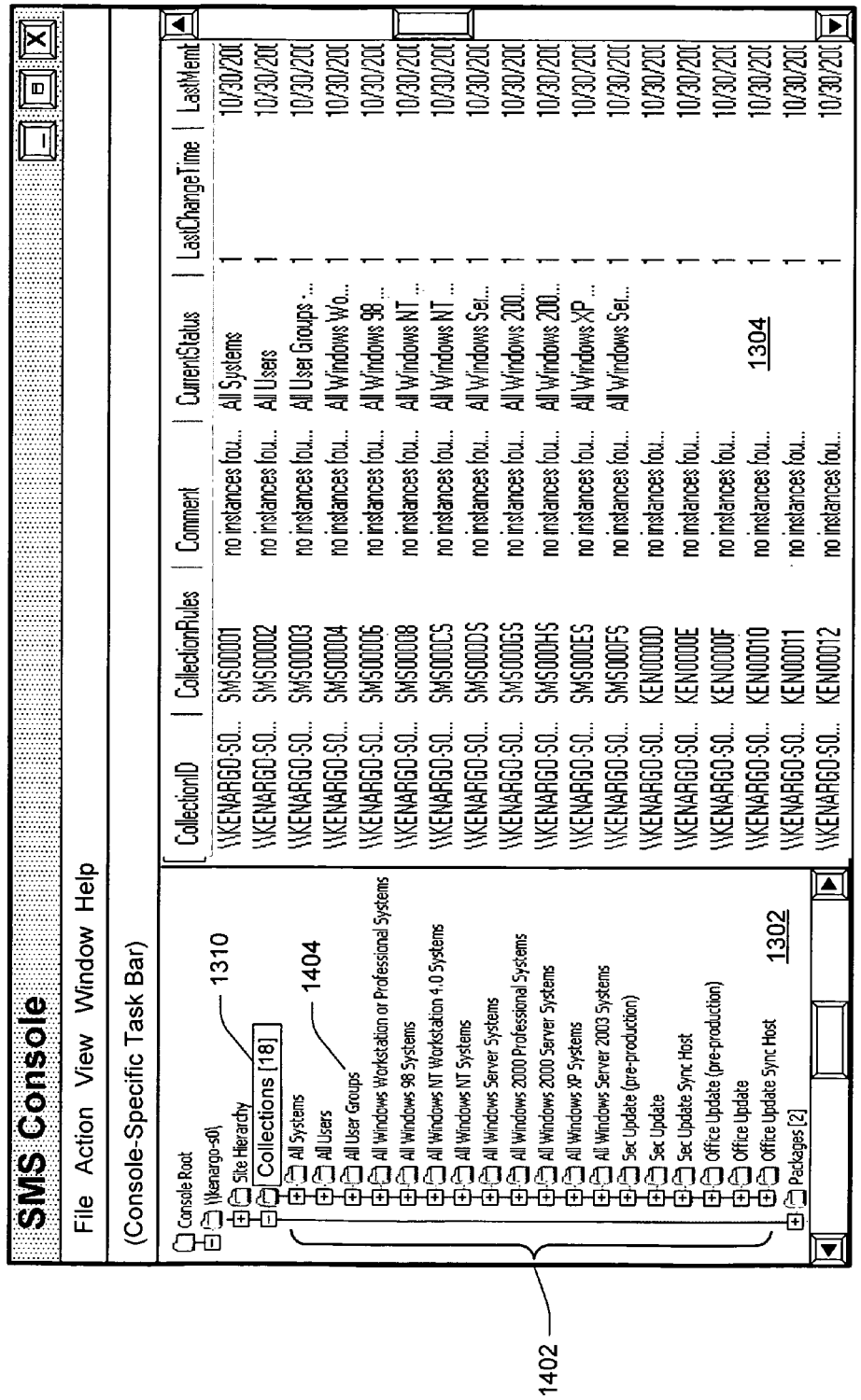

To begin with, FIG. 13 shows a main user interface presentation 1300 provided by the management system 502. The main user interface presentation 1300 includes a scope pane 1302 and a result pane 1304. In this particular example, the user 510 has selected the root node 1306 in the scope pane 1304, whereupon the management system 502 provides corresponding detail in the result pane 1304.

The root node 1306 includes a plurality of child nodes 1308, including a Collections node 1310. Assume that the user 510 selects the Collections node 1310 (e.g., by clicking on the Collections node 1310 in the scope pane 1302. This prompts the management system 502 to present the user interface presentation 1400 shown in FIG. 14. The scope pane 1302 of this user interface presentation 1400 enumerates a collection of child nodes 1402 associated with the collection node 1310. The result pane 1304 shows data corresponding to the child nodes 1402.

FIGS. 15-19 show an exemplary console-related description language content 504 that defines the information presented in the user interface presentation 1400. Note that the XML content in the console-related description language content 504 includes many of the elements defined in connection with FIG. 7. The particular XML elements in these figures are demarcated by descriptive tags associated with the elements (identified by the conventional XML "< . . . > . . . </ . . . >" notation). Several of these elements are described below.

<Name>. The Name element identifies a name associated with an identified node that is displayed in the scope pane 1302 (e.g., in this case, the Collections node 1310).

<Description>. The Description element identifies descriptive information that is presented by the user interface presentation 1400 upon selection of an identified node.

<Guid>. The Guid element provides a unique identifier that identifies a node. For instance, the Guid provide a reference that allows third parties to associate tools with the node.

<ImagesDetails>. The ImagesDetails element provides information that identifies what kind of image information is presented in the scope pane 1302 for an identified node (for a selected state in which the node has been selected, and for an unselected state in which the node has not been selected).

<ViewAssemblyImageDetails>. The ViewAssemblyImageDetails element governs the manner in which data associated with an identified node is presented in the user interface presentation 1400. Possible modes of display include graphical type presentation, tabular type presentation, textual type presentation, spreadsheet type presentation, and so on.

<ClipboardFormats>. The ClipboardFormats element specifies a format that applies when information is "dragged" to an identified node.

<Actions>. The Actions element specifies what menu(s) are presented (and in what order the menus are presented) when the user 510 right-clicks on an identified node.

<Query> related tags. Various query-related elements govern the manner in which the management system 502 executes queries to retrieve information from the target functionality 512. For example, a <QueryDetail> element (e.g., element 1602 in FIG. 16) specifies a type of query that should be executed. Namely, this element can invoke particular retrieval functionality 514 (e.g., WQL retrieval functionality) for accessing information from the target functionality 512.

As to the queries themselves, the XML description shown in FIGS. 15-19 specifies four queries, corresponding to the four enumerated queries summarized above in the context of FIG. 7. To begin with, the query 1604 shown in FIG. 16 populates the child nodes 1402 in the scope pane 1302 when the user clicks on the Collections node 1310. More specifically, for instance, the query 1604 retrieves various fields of information, including name information. Such name information "plugs into" the Name element 1606 shown in FIG. 16, to provide name information associated with the child nodes 1402 of the Collections node 1310. The next query 1702 in FIG. 17 populates the result pane 1304 with data based on the selection of the Collections node 1310. The first two queries (1604, 1702) correspond to so-called unscoped queries, as these retrieval operations are not governed by a context established by a parent node.

In contrast, query 1802 shown in FIG. 18 corresponds to a scoped query. The query 1802 is scoped in the sense that it is defined by a context established by a parent node, in this case, the Collections node 1310. More precisely, query 1802 is invoked, for example, when the user 510 clicks on one of the child nodes 1402 associated with the Collections node 1310, such as the exemplary "All User Groups" child node 1404. This action effectively fills out the CollectionID field enclosed in brackets within the query 1802, and also causes the management system 502 to expand the scope pane 1302 by displaying the child nodes (not shown) of the All User Group node 1404. A final scoped query 1902 in FIG. 19 populates the result pane 1304 for a selected scoped node (such as the All User Groups node 1404).

A node need not include each of the queries enumerated above. For example, a node may include only a result pane query used to populate the result pane 1304. Indeed, a node need not execute any query; in this case, the XML content 504 can itself be used to specify the behavior of the management system 502 when the user 510 clicks on a query-less node (e.g., by providing child information to populate a subtree, etc.).

Still alternatively, a node can implement one or more queries in code, and the XML context 504 can serve the purpose of pointing to this code so that it can be accessed when the user 510 selects a corresponding node.

D.2. Exemplary User Interface XML and Associated UI Presentations

Figure 20:
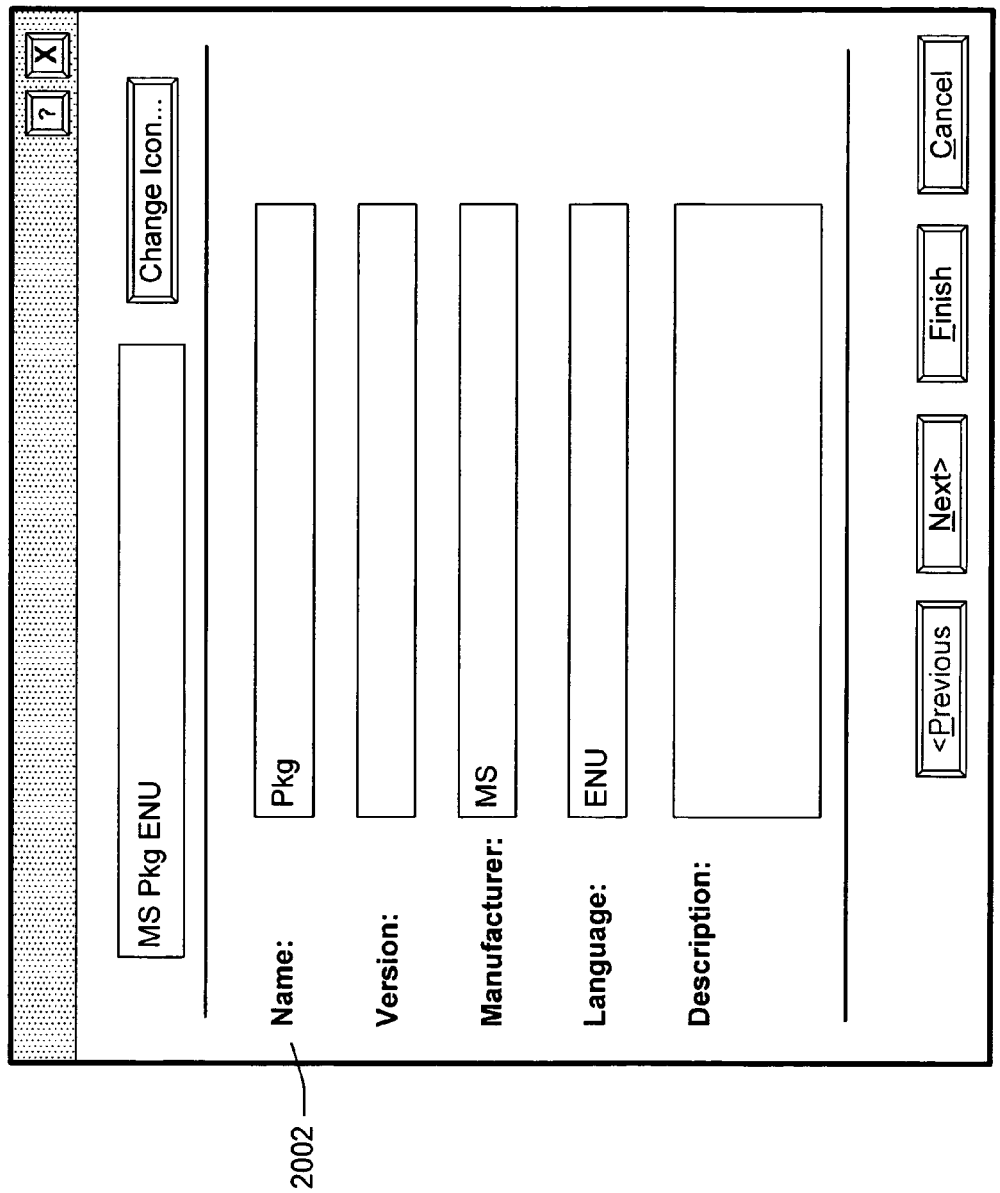
Figure 21:
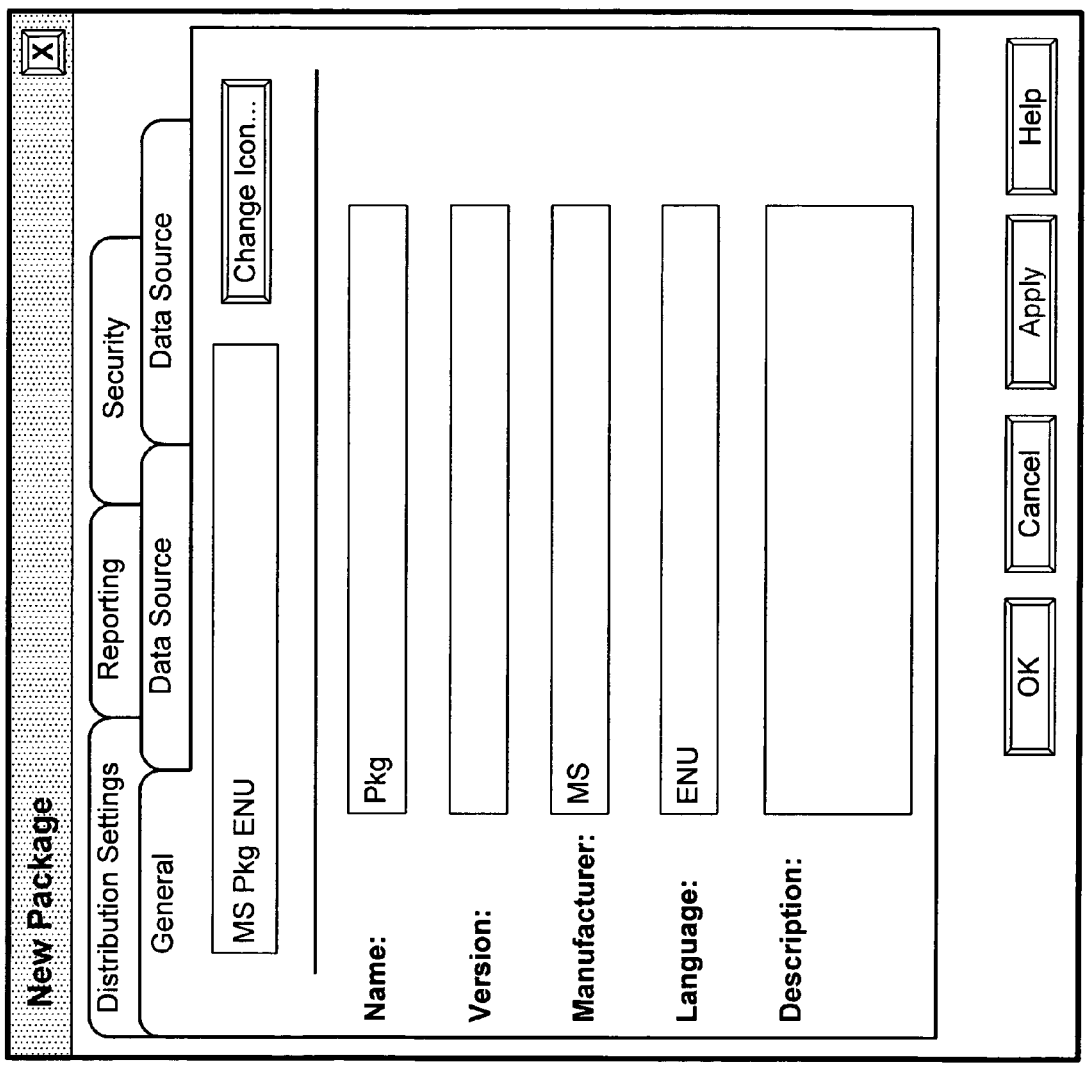

FIGS. 20 and 21 show exemplary dialog-related user interface presentations (2000, 2100) produced by the management system 502, based on dialog-related description language content 506. Namely, FIG. 20 shows a first rendition of a dialog-related user interface presentation 2000 that uses a wizard paradigm to combine multiple pages together. As mentioned earlier, a wizard provides a sequence of pages through which the user 510 can sequence in a defined order; FIG. 20 shows just one of the pages in this sequence. FIG. 21 shows a second rendition of a dialog-related user interface presentation 2100 that uses a tabbed paradigm to combine multiple pages together. A tabbed presentation allows a user to select any page at any time from a collection of tabs that are typically accessible to each page (e.g., in the case of FIG. 21, the tabs are presented at the top of each page); FIG. 21 shows just one of the tabbed pages.

FIGS. 22-25 show exemplary dialog-related description language content 506 that defines salient aspects of the dialog-related user interface presentations (2000, 2100). More specifically, the dialog-related description language content 506 defines how predefined user interface building blocks can be customized in various respects to a suit a particular application. For instance, the customization may pertain to the selection of a particular type of dialog-related user interface presentation and the arrangement of its constituent parts. The customization may also specify how the dialog-related user interface presentation is filled out. For instance, the customization can define default information that is presented in the dialog-related user interface presentation. The customization can also define rules used to validate information that is input into the dialog-related user interface presentation. Still other facets of the dialog-related user interface presentation can be defined via the dialog-related description language content 506. In one implementation, however, the purpose of the dialog-related description language content 506 is not to specify the composition of the UI features that appear in the dialog-related user interface presentation from "scratch"; rather, these UI features are provided as pre-existing building blocks (in the generic resource library 508) that are selected, customized and assembled by the dialog-related description language content 506.

Note that the XML content in FIGS. 22-25 includes many of the elements defined in previous sections of this disclosure. The particular XML elements in these figures are demarcated by descriptive tags associated with the elements (identified by the conventional XML "< . . . > . . . </ . . . >" notation). Several of these elements are described below.

Tags defining the type of presentation. An introductory section 2202 of the dialog-related description language content 506 specifies the basic framework of the dialog-related user interface presentation that is to be presented, e.g., by identifying its GUID, assembly name, etc. Some dialog-related user interface presentations can be formulated as either wizards or as tabbed presentations. An IsWizard definition 2204 specifies whether the presentation will be configured as a wizard or tabbed presentation. That is, the IsWizard field 2204 can define whether the content 506 renders the wizard display of FIG. 20 or the tabbed display of FIG. 21. In the illustrated example, this field specifies that IsWizard ="True," meaning that a wizard-type format is being used.

Information defining the manner of presentation of user interface parts. The dialog-related user interface presentation can include one or more pages. The XML content that follows the introductory section 2202 specifies the manner in which the parts of the dialog-related user interface presentation are combined together. Namely, a <PropertyPage Guid> tag demarcates the start of each page in the multi-page user interface presentation. As illustrated, the XML content in FIGS. 22-25 describes each page in sequence. This sequence defines an order in which pages will be presented. For instance, if the wizard-type format is selected, the order of page descriptions in the XML content defines the order in which corresponding pages will appear in the wizard. Moreover, a "Skippable" field (e.g., field 2206) associated with each page defines whether that page is invoked in the wizard presentation. Thus, a "Skippable=False" definition indicates that the management system 502 will present an associated page, while a "Skippable=True" definition indicates that the management system 502 will not present the associated page. In the described implementation, the management system 502 simply does not display a page that is skipped over; but in an alternative implementation, the Skippable field can determine whether or not the end-user is independently empowered to deactivate or skip over a page within the multi-part presentation. Through this provision, the designer (or the end-user) can easily toggle pages into or out of a dialog-related user interface presentation to suit the demands of individual applications and environments, all without modifying the code itself.

Help information. A HelpTopic field (e.g., field 2208) defines the help-related information that is presented for each page in the presentation.

Default information. The XML content 506 also defines what information is populated in the user interface pages as a default. For instance, the default information may specify what information is automatically filled in when the user first visits a page, or may alternatively specify what information is automatically filled in only in the event that the user leaves a page without filling in certain fields. Consider, for example, a Name input field 2002 shown in FIG. 20. The XML content 506, by virtue of the DefaultValue field 2210 in FIG. 22, specifies that this page of the wizard will automatically populate the Name field with the value "Pkg." A DefaultValue=" " definition indicates that the management system will populate no default information in a corresponding user interface field. The particular default definitions shown in FIGS. 22-25 are exemplary. Those skilled in the art will appreciate that any aspect of the user interface presentation can be defined via default information contained in the XML content 506.

Validation information. The XML content 506 also defines the rules which govern what information an end-user is permitted to input via the dialog-related user interface presentation. For example, again consider the exemplary Name input field 2002 shown in FIG. 20. The XML content 506 includes a portion 2212 that declaratively defines the rules which govern what information an end-user can input into the Name field 2002. More specifically, MinLength and MaxLength fields define the minimum and maximum number of characters that constrain a permissible input response. A <MustMatchPatterns> series of rules defines content that must appear in the user's response, while a <MustNotMatchPatterns> series of rules defines content that must not appear in the user's response. Any kind of constraint can be invoked by these positive and negative rules. In a typical scenario, these rules which specify the kinds of alpha-numeric characters that can be received via an input field, for example, mandating that only alphabetical characters be input, only numeric characters be input, only upper case letters be input, only lower case letters be input, and so forth. In addition, the rules can become more complex, e.g., by mandating that certain characters in a sequence meet predetermined criteria, or even providing conditional-type rules (e.g., if a character is a period "." then the next character should be an uppercase alphabetical character), and so forth. One way of implementing the positive and negative validation rules is via regular expression technology. In this approach, a regular expression definition specifies the permissible format that constrains a user's input response. A regular expression engine then accepts a user's actual response and compares it to the permitted response, returning an indication of whether the user's response meets the positive and negative rules set forth in the permitted response. The exemplary portion 2212 shown in FIG. 22 specifies that RegEx=" ", meaning that any legal alphanumeric character can be input (providing that it is at least 1 character and no greater than 35 characters, which is a constraint imposed by the MinLength and MaxLength fields). The particular validation constraints shown in FIGS. 22-25 are exemplary. Those skilled in the art will appreciate that any aspect of the user interface presentation can be constrained via the validation information contained in the XML content 506.

More generally, the specific elements and organization of elements described in this Appendix are illustrative and non-limiting. Those skilled in the art will appreciate that other declarative-based strategies exist for implementing the general principles set forth herein.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer management system stored on a tangible computer-readable medium is configured to interact with management information stored in a management information source and to display a dialog-related user interface presentation on a monitor screen, the computer management system comprising:

description language content which describes at least one aspect of the computer management system, the description language content created by a user, the description language content configured to adapt general purpose computer resources to implement user-selected management-related services by invoking generic resource content specifically referenced by the description language content, wherein the description language content comprises console-related description language content and dialog-related description language content, wherein the console-related description language content is configured to query target functionality to extract management information from one or more stores provided by the target functionality, wherein the management information is used to construct nodes establishing boundaries of the management system, the nodes to be displayed in a scope pane of the user interface, and wherein the management information is further used to provide detailed information about the nodes, the detailed information to be displayed within a result pane of the user interface presentation, and wherein the dialog-related description language content is configured to provide descriptive information to adapt general purpose user interface building blocks to provide specific dialog-related user interface presentations;

generic resource content expressed in a machine-readable code language for performing at least one generic task that is applicable to a plurality of applications of the computer management system; and functionality for implementing the computer management system based on a combination of declarative information specified in the description language content and generic resources provided by the generic resource content, wherein the description language content tailors the generic resource content to provide the computer management system with the ability to retrieve and modify configuration data for a plurality of computer systems, wherein the computer management system provides management information corresponding to at least one node, and wherein the description language content describes aspects of the computer management system on a per-node basis, and wherein at least one part of the description language content corresponding to a child node is supplied by description language content associated with a parent or ancestor node.

2. The computer management system of claim 1, wherein there description language content is expressed in a markup language.

3. The computer management system of claim 1, wherein said at least one aspect described by the description language content governs a manner of populating management information to be presented by the computer management system.

4. The computer management system of claim 3, wherein said at least one aspect described by the description language content sets forth a query to be executed to retrieve the management information from a management information source, to thereby populate the computer management system.

5. The computer management system of claim 4, wherein the query defines functionality to be used for retrieving the management information.

6. The computer management system of claim 4, wherein the query defines the management information to be retrieved.

7. The computer management system of claim 4, wherein the query comprises one or more of:
a query to populate management information in the scope pane of the computer management system; and
a query to populate management information in the result pane of the computer management system.

8. The computer management system of claim 7, wherein:
the query to populate management information in the scope pane comprises a first query to populate the management information for an unscoped state, corresponding to a case in which the query pertains to a management information node having no relationship to a parent that governs the retrieval of information;

the query to populate management information in the scope pane additionally comprises a second query to populate the management information for a scoped state, corresponding to a case in which the query pertains to a management information node has a relationship to a parent that governs the retrieval of information that has a relationship to a parent that governs the retrieval of information;

the query to populate management information in the result pane comprises a third query to populate the management information for an unscoped state, corresponding to a case in which the query pertains to a management information node having no relationship to a parent that governs the retrieval of information; and the query to populate management information in the result pane additionally comprises a fourth query to populate the management information for a scoped state, corresponding to a case in which the query pertains to management information node that has a relationship to a parent that governs the retrieval of information.

9. The computer management system of claim 1, wherein said at least one aspect described by the description language content governs a manner of presenting retrieved management information.

10. The computer management system of claim 1, wherein said at least one aspect described by the description language content governs a manner in which a user can interact with management information presented by the computer management system.

11. The computer management system of claim 10, wherein the computer management system is configured to provide a context menu when the user interacts with a part of the management information, and wherein said at least one aspect governs the operations that can be invoked by a user via the context menu.

12. The computer management system of claim 1, wherein the description language content is constructed based on a schema, wherein the schema comprises at least one of: a master schema;
an organization-specific schema which modifies the master schema for use within the organization; or
a user-specific schema which modifies the master schema for use by one or more users.

13. One or more machine-readable media containing machine readable instructions for implementing the computer management system of claim 1.

14. A computer management system stored on a tangible computer-readable medium is configured to interact with management information stored in a management information source and to display a dialog-related user interface presentation on a monitor screen, the computer management system comprising:

description language content created by a user, the description language content configured to adapt general purpose computer resources to implement user-selected management-related services by invoking generic resource content specifically referenced by the description language content, the description language content comprising:

first description language content which governs a manner of populating management information to be presented by the computer management system, wherein the first description language content defines a query to be executed to retrieve the management information from the management information source, wherein the first description language content is configured to query target functionality to extract management information from one or more stores provided by the target functionality, wherein the management information is used to construct nodes establishing boundaries of the management system, the nodes to be displayed in a scope pane of the user interface, second description language content which governs a manner of presenting retrieved management information, wherein the management information is further used to provide detailed information about the nodes, the detailed information to be displayed within a result pane of the user interface presentation, and third description language content which governs a manner in which a user can interact with management information presented by the computer management system, wherein the third description language content is configured to provide descriptive information to adapt general purpose user interface building blocks to provide specific dialog-related user interface presentations;

generic resource content expressed in a machine-readable code for performing at least one generic task that is applicable to a plurality of applications of the computer management system; and functionality for implementing the computer management system based on a combination of the description language content and the generic resource content, wherein the description language content tailors the generic resource content to provide the computer management system with the ability to retrieve and modify configuration data for a plurality of computer systems.

15. A method for providing management-related services and displaying a dialog-related user interface presentation on a monitor screen, the method comprising:

providing description language content which describes at least one aspect of a computer management system, the description language content comprising:

first description language content which governs a manner of populating management information to be presented by the computer management system, wherein the first description language content defines a query to be executed to retrieve the management information from the management information source, wherein the first description language content is configured to query target functionality to extract management information from one or more stores provided by the target functionality, wherein the management information is used to construct nodes establishing boundaries of the management system, the nodes to be displayed in a score pane of the user interface, second description language content which governs a manner of presenting retrieved management information, wherein the management information is further used to provide detailed information about the nodes, the detailed information to be displayed within a result pane of the user interface presentation, and third description language content which governs a manner in which a user can interact with management information presented by the computer management system, wherein the third description language content is configured to provide descriptive information to adapt general purpose user interface building blocks to provide specific dialog-related user interface presentations:

providing generic resource content expressed in a machine-readable code language for performing at least one generic task that is applicable to a plurality of applications of the computer management system; and implementing the computer management system based on a combination of the description language content and the generic resource content, wherein the description language content tailors the generic resource content to provide the computer management system with the ability to retrieve and modify configuration data for a plurality of computer systems.

16. One or more machine-readable media instructions for implementing the method of claim 15.

\* \* \* \* \*